United States Patent
Wu et al.

(10) Patent No.: US 11,341,174 B2
(45) Date of Patent: May 24, 2022

(54) VOICE-BASED KNOWLEDGE SHARING APPLICATION FOR CHATBOTS

(71) Applicant: Microsoft Technology Licensing, LLC, Redmond, WA (US)

(72) Inventors: Xianchao Wu, Tokyo (JP); Kazushige Ito, Kashiwa (JP); Daigo Hamura, Bellevue, WA (US); Keizo Fujiwara, Kawasaki (JP); Mina Miyoshi, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 16/487,254

(22) PCT Filed: Mar. 24, 2017

(86) PCT No.: PCT/CN2017/078062
§ 371 (c)(1),
(2) Date: Aug. 20, 2019

(87) PCT Pub. No.: WO2018/170876
PCT Pub. Date: Sep. 27, 2018

(65) Prior Publication Data
US 2021/0141818 A1 May 13, 2021

(51) Int. Cl.
*G06F 16/332* (2019.01)
*G06N 5/02* (2006.01)
(Continued)

(52) U.S. Cl.
CPC ......... *G06F 16/3329* (2019.01); *G06N 5/022* (2013.01); *G10L 15/22* (2013.01); *H04L 51/02* (2013.01); *G10L 2015/225* (2013.01)

(58) Field of Classification Search
CPC ..... G06F 16/3329; G06N 5/022; H04L 51/02; G10L 15/22; G10L 2015/225
See application file for complete search history.

(56) References Cited

U.S. PATENT DOCUMENTS

| 5,384,703 A * | 1/1995 | Withgott | ............... G06F 16/345 715/236 |
| 5,617,407 A * | 4/1997 | Bareis | ...................... G11B 7/24 360/53 |

(Continued)

FOREIGN PATENT DOCUMENTS

| CN | 101286161 A | 10/2008 |
| CN | 104183246 A | 12/2014 |

(Continued)

OTHER PUBLICATIONS

Specification of U.S. Appl. No. 62/298,418, filed Feb. 22, 2016 (Year: 2016).*

(Continued)

*Primary Examiner* — Eric Yen
(74) *Attorney, Agent, or Firm* — Schwegman Lundberg & Woessner, P.A.

(57) ABSTRACT

The present disclosure provides a method for providing voice-based knowledge through intelligent automated chatting. An input is received. A knowledge message is selected from a set of knowledge messages in response to the input, wherein a length of a voice corresponding to each of the set of knowledge messages is no more than a predefined length. The voice corresponding to the knowledge message is output in a conversation of the intelligent automated chatting.

17 Claims, 13 Drawing Sheets

(51) Int. Cl.
*G10L 15/22* (2006.01)
*H04L 51/02* (2022.01)

(56) References Cited

U.S. PATENT DOCUMENTS

| | | | | |
|---|---|---|---|---|
| 5,689,716 | A * | 11/1997 | Chen | G06F 16/345 715/256 |
| 5,907,836 | A * | 5/1999 | Sumita | G06F 16/30 707/754 |
| 6,144,938 | A * | 11/2000 | Surace | G10L 13/033 704/257 |
| 6,185,527 | B1 * | 2/2001 | Petkovic | G06F 16/64 704/231 |
| 6,366,905 | B1 * | 4/2002 | Netz | G06F 16/22 707/600 |
| 6,501,956 | B1 * | 12/2002 | Weeren | H04L 67/04 455/463 |
| 6,573,907 | B1 * | 6/2003 | Madrane | G11B 27/034 715/719 |
| 6,580,786 | B1 * | 6/2003 | Yarlagadda | H04M 3/5315 379/88.17 |
| 6,766,287 | B1 * | 7/2004 | Kupiec | G06F 40/253 704/9 |
| 7,177,817 | B1 | 2/2007 | Khosla et al. | |
| 7,272,558 | B1 * | 9/2007 | Soucy | G10L 15/063 704/235 |
| 8,566,102 | B1 * | 10/2013 | Bangalore | G10L 15/22 704/270.1 |
| 8,769,008 | B1 | 7/2014 | Young et al. | |
| 8,782,140 | B1 * | 7/2014 | Green | H04L 67/306 709/205 |
| 8,843,372 | B1 * | 9/2014 | Isenberg | G10L 25/48 704/250 |
| 9,386,113 | B1 | 7/2016 | Goncharuk et al. | |
| 9,412,394 | B1 * | 8/2016 | Yuasa | G10L 15/1822 |
| 9,443,515 | B1 * | 9/2016 | Boyce | A01K 1/035 |
| 9,479,931 | B2 | 10/2016 | Ortiz, Jr. et al. | |
| 10,360,265 | B1 * | 7/2019 | Agarwal | G06F 16/90332 |
| 10,885,342 | B1 * | 1/2021 | Day | G10L 15/07 |
| 2002/0023144 | A1 * | 2/2002 | Linyard | G06F 16/954 709/218 |
| 2002/0087313 | A1 * | 7/2002 | Lee | G10L 15/197 704/254 |
| 2003/0033152 | A1 * | 2/2003 | Cameron | G10L 15/26 704/275 |
| 2003/0167167 | A1 | 9/2003 | Gong | |
| 2004/0019637 | A1 * | 1/2004 | Goodman | H04L 51/02 709/204 |
| 2004/0068486 | A1 * | 4/2004 | Chidlovskii | G06F 16/9535 |
| 2004/0093216 | A1 * | 5/2004 | Ashish | G10L 15/30 704/270.1 |
| 2004/0093321 | A1 * | 5/2004 | Roustant | G06F 16/9535 |
| 2004/0141597 | A1 * | 7/2004 | Giacomelli | G10L 15/26 379/88.17 |
| 2004/0186727 | A1 * | 9/2004 | Andrade | H04R 1/083 704/275 |
| 2005/0091057 | A1 * | 4/2005 | Phillips | G10L 15/30 704/270.1 |
| 2005/0144247 | A1 | 6/2005 | Christensen et al. | |
| 2006/0200371 | A1 * | 9/2006 | Spector | G06N 5/00 706/45 |
| 2007/0094003 | A1 * | 4/2007 | Huang | G06F 40/35 704/3 |
| 2007/0203996 | A1 * | 8/2007 | Davitz | G06F 16/90335 709/206 |
| 2009/0144428 | A1 * | 6/2009 | Bowater | G06F 3/16 709/227 |
| 2009/0204399 | A1 * | 8/2009 | Akamine | G10L 15/1822 704/235 |
| 2010/0269158 | A1 * | 10/2010 | Ehler | H04L 63/102 726/4 |
| 2011/0055209 | A1 * | 3/2011 | Novac | G06Q 30/02 707/737 |
| 2011/0153312 | A1 * | 6/2011 | Roberts | G06F 16/3329 704/9 |
| 2012/0150772 | A1 * | 6/2012 | Paek | H04L 51/32 706/12 |
| 2013/0007037 | A1 * | 1/2013 | Azzam | G06F 16/3329 707/769 |
| 2013/0018895 | A1 * | 1/2013 | Harless | G10L 15/1822 707/748 |
| 2013/0073276 | A1 * | 3/2013 | Sarikaya | G06F 40/58 704/2 |
| 2013/0159377 | A1 | 6/2013 | Nash | |
| 2013/0311181 | A1 * | 11/2013 | Bachtiger | G06F 16/685 704/235 |
| 2014/0122083 | A1 | 5/2014 | Xiaojiang | |
| 2014/0122619 | A1 | 5/2014 | Duan et al. | |
| 2015/0006143 | A1 * | 1/2015 | Skiba | G06F 40/30 704/2 |
| 2015/0026255 | A1 | 1/2015 | Wexler | |
| 2015/0199967 | A1 * | 7/2015 | Reddy | G10L 25/30 704/249 |
| 2015/0382079 | A1 | 12/2015 | Lister et al. | |
| 2016/0005395 | A1 * | 1/2016 | Williams | G10L 15/22 704/244 |
| 2016/0180242 | A1 * | 6/2016 | Byron | G06N 5/041 706/11 |
| 2016/0351206 | A1 * | 12/2016 | Gelfenbeyn | G10L 15/26 |
| 2017/0004396 | A1 * | 1/2017 | Ghotbi | G06N 3/006 |
| 2017/0169816 | A1 * | 6/2017 | Blandin | G10L 15/08 |
| 2017/0171121 | A1 * | 6/2017 | Zhang | H04L 51/066 |
| 2017/0242651 | A1 * | 8/2017 | Lang | G06F 3/165 |
| 2017/0263265 | A1 * | 9/2017 | Ashikawa | G06F 3/04817 |
| 2017/0351962 | A1 * | 12/2017 | Appel | G06N 7/005 |
| 2018/0308508 | A1 * | 10/2018 | Eyben | G10L 25/27 |
| 2018/0342095 | A1 * | 11/2018 | Walsh | G06K 9/00335 |
| 2018/0373793 | A1 * | 12/2018 | Eriksson | G06F 17/30843 |
| 2019/0129920 | A1 * | 5/2019 | Bainer | G06F 16/345 |
| 2019/0199606 | A1 * | 6/2019 | Hasegawa | H04L 51/063 |
| 2019/0266250 | A1 * | 8/2019 | Toplyn | G06F 40/30 |
| 2019/0349321 | A1 * | 11/2019 | Cai | G06F 40/237 |
| 2020/0244803 | A1 * | 7/2020 | Curtin | G10L 15/22 |

FOREIGN PATENT DOCUMENTS

| | | |
|---|---|---|
| CN | 104598445 A | 5/2015 |
| CN | 105183848 A | 12/2015 |
| CN | 105975531 A | 9/2016 |
| JP | 2003216439 A | 7/2003 |
| KR | 20140019136 A | 2/2014 |

OTHER PUBLICATIONS

Chen, B., Lin, S. H., Chang, Y. M., & Liu, J. W., "Extractive speech summarization using evaluation metric-related training criteria", 2013, Information Processing & Management, 49(1), 1-12.*

"Customize your Google Assistant settings", Retrieved from: https://web.archive.org/web/20170314161953/https://support.google.com/assistant/answer/7172704?hl=en, Retrieved Date: Mar. 14, 2017, 2 Pages.

"Meet Alexa", https://www.amazon.com/b/ref=echo_dp_pack?node=16067214011, Retrieved on: Jan. 20, 2017, 2 Pages.

"The Google App", Retrieved from: https://www.google.com/search/about/, Retrieved Date: Dec. 9, 2019, 04 Pages.

"Virtual Assistant Denise", Retrieved from: https://web.archive.org/web/20161120014109/https://www.nextos.com/, Retrieved Date: Nov. 20, 2016, 11 Pages.

Costa, et al., "Emotion-Based Recommender System for Overcoming the Problem of Information Overload", In Proceedings of the International Conference on Practical Applications of Agents and Multi-Agent Systems, May 22, 2013, 12 Pages.

Crider, Michael, "How to Use and Customize Cortana in Windows 10", Retrieved from: https://web.archive.org/web/20161119195433/http://www.digitaltrends.com/computing/how-to-use-and-customize-cortana-in-windows-10/, Jul. 28, 2015, 15 Pages.

"International Search Report and Written Opinion Issued in PCT Application No. PCT/CN17/078062", dated Dec. 27, 2017, 11 Pages.

(56) References Cited

OTHER PUBLICATIONS

Zheng, et al., "Penetrate: Personalized News Recommendation Using Ensemble Hierarchical Clustering", In Journal of Expert Systems with Applications, May 1, 2013, pp. 2127-2136.

"Search Report Issued in European Patent Application No. 17901442.8", dated Oct. 20, 2020, 8 Pages.

"First Office Action and Search Report Issued in Chinese Patent Application No. 201780034615.8", (w/ English Summary), dated Feb. 3, 2021, 14 Pages.

"Second Office Action and Search Report Issued in Chinese Patent Application No. 201780034615.8", dated Sep. 10, 2021, 16 Pages.

"Notice of Allowance Issued in Chinese Patent Application No. 201780034615.8", dated Mar. 9, 2022, 10 Pages.

Feng, Sheng, "Research and Development for Conservation of Chatbot System", In Journal of Technique and Applications for Robot, Aug. 15, 2016, 63 Pages.

\* cited by examiner

VOICE-BASED KNOWLEDGE SHARING APPLICATION FOR CHATBOTS

CROSS-REFERENCE TO RELATED APPLICATIONS

This application is a U.S. National Stage Filing under 35 U.S.C. 371 of International Patent Application Serial No. PCT/CN2017/078062, filed Mar. 24, 2017, and published as WO 2018/170876 A1 on Sep. 27, 2018, which application and publication are incorporated herein by reference in their entirety.

BACKGROUND

Artificial intelligence (AI) conversational chat programs are becoming more and more popular. These conversational chat programs, also referred to as "chatbots", allow users to carry on conversations with a virtual entity. Various applications may be implemented in the conversation between a user and a chatbot.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide a method for providing voice messages through intelligent automated chatting. An input is received. A voice message is selected from a plurality of voice messages in response to the input, wherein a length of each of the plurality of voice messages is no more than a predefined length. The voice message is output in a conversation of the intelligent automated chatting.

It should be appreciated that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

Figure 1:
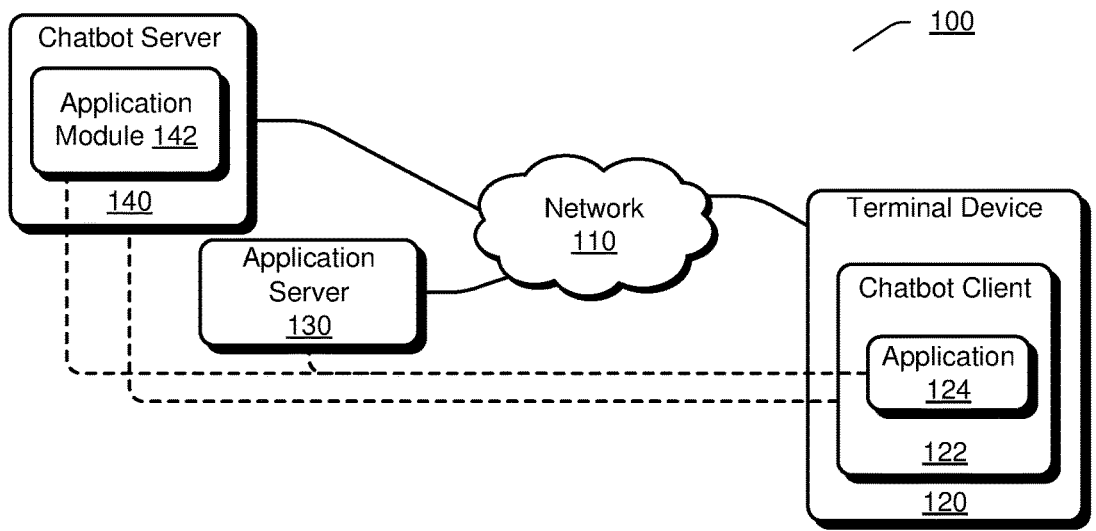
FIG. 1 illustrates an exemplary environment where the described techniques can be implemented according to an embodiment.

FIG. 1 illustrates an exemplary environment 100 where the described techniques can be implemented according to an embodiment.

In the exemplary environment 100, a network 110 is applied for interconnecting among a terminal device 120, an application server 130 and a chatbot server 140.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of computing device capable of connecting to the network 110, assessing servers or websites over the network 110, processing data or signals, etc. For example, the terminal device 120 may be a desktop computer, a laptop, a tablet, a smart phone, a sound box, etc. Although only one terminal device 120 is shown in FIG. 1, it should be appreciated that a different number of terminal devices may connect to the network 110.

The terminal device 120 may include a chatbot client 122 which may provide a chat service for a user. In some implementations, the chatbot client 122 at the terminal device 120 may be an independent client application corresponding to the chatbot service provided by the chatbot server 140. In some other implementations, the chatbot client 122 at the terminal device 120 may be implemented in a third party application such as a third party instant messaging (IM) application. Examples of the third party IM message comprise MSN™, ICQ™, SKYPE™, QQ™, WeChat™ and so on.

The chatbot client 122 communicates with the chatbot server 140. For example, the chatbot client 122 may transmit messages inputted by a user to the chatbot server 140, and receive responses associated with the messages from the chatbot server 140. The chatbot client 122 and the chatbot server 140 may be collectively referred to as a chatbot. As the conversation between the user and the chatbot is performed typically in a query-response manner, the messages inputted by the user are commonly referred to as queries, and the answers outputted by the chatbot are commonly referred to as responses. The query-response pairs may be recorded as user log data. It should be appreciated that, in some implementations, instead of interacting with the chatbot server 140, the chatbot client 122 may also locally generate responses to queries inputted by a user.

An application 124 may be activated during a conversation between the chatbot and a user. For example, the application 124 may be associated with a list of trigger words. The chatbot may activate the application during the conversation when deciding that a user's input is matching one of the trigger words.

In some implementations, the application 124 may be implemented at an application server 130, which may be a third part application server. For example, while the application 124 is active during the conversation, a query from a user is sent to the application server 130 via the chatbot, and a response from the application server 130 is sent to the user via the chatbot. In some other implementations, the application 124 may be implemented at the chatbot server 140, and in this case an application module 142 may be implemented at the chatbot server 140. Applications provided by the chatbot service provider and/or applications provided by third party application providers may be implemented at the application module 142. The chatbot may call an application at the application module 142 in order to activate the application during the conversation. In some implementations, the application 124 may be used to providing voice-based knowledge through intelligent automated chatting according to an embodiment.

It should be appreciated that the application 124 associated with the chatbot service may also be referred to as a feature, a function, an applet, or the like, which is used to satisfy a relatively independent requirement of a user during a machine conversation with the user.

It should be appreciated that all the network entities shown in FIG. 1 are exemplary, and depending on specific application requirements, any other network entities may be involved in the environment 100.

Figure 2:
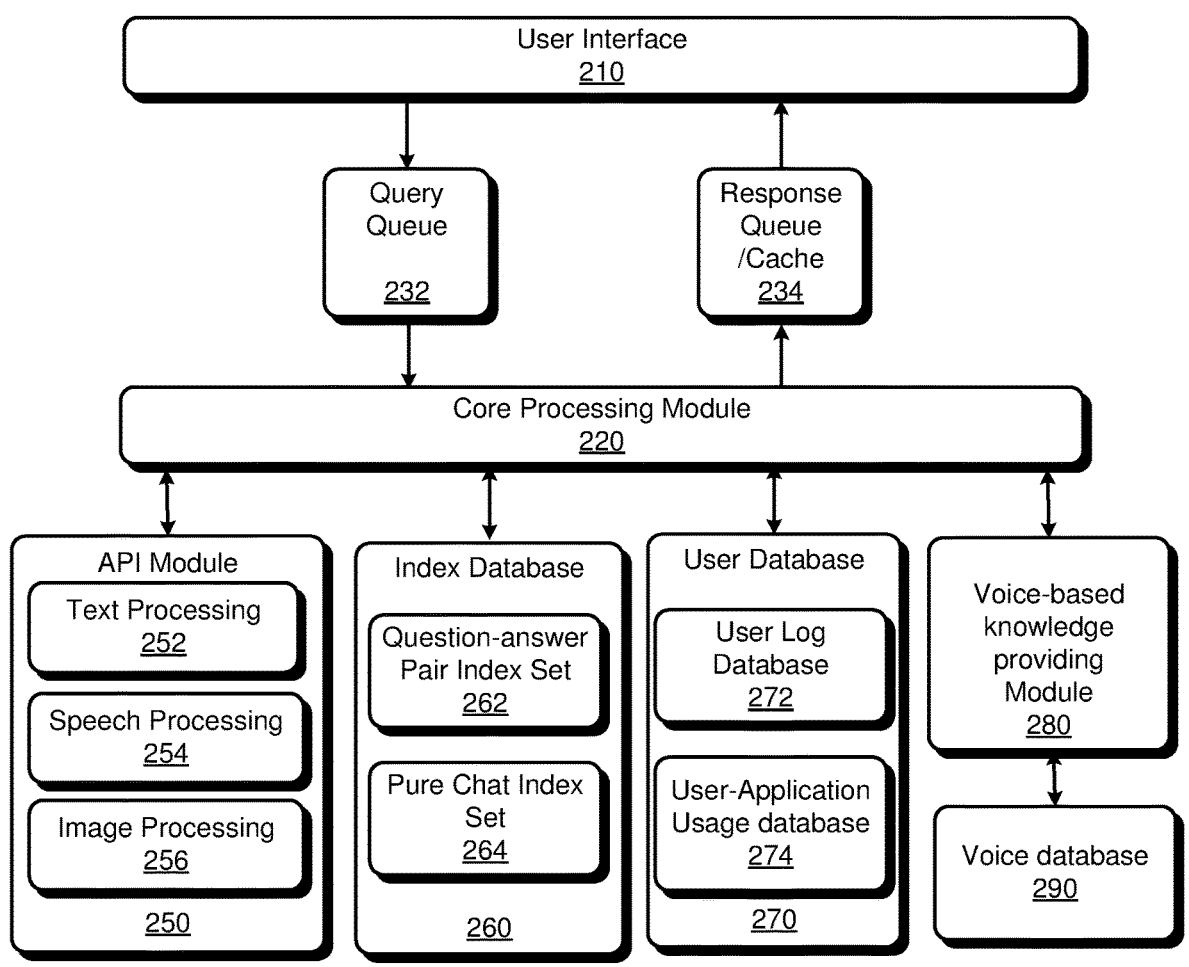
FIG. 2 illustrates an exemplary system applying a chatbot according to an embodiment.

FIG. 2 illustrates an exemplary chatbot system 200 according to an embodiment.

The system 200 may comprise a user interface (UI) 210. The UI 210 may be implemented at the chatbot client 122, and provide a visual chat window for interacting between a user and the chatbot. The UI 210 may also be implemented totally by sound input and output, instead of using a visual chat window.

Figure 3:
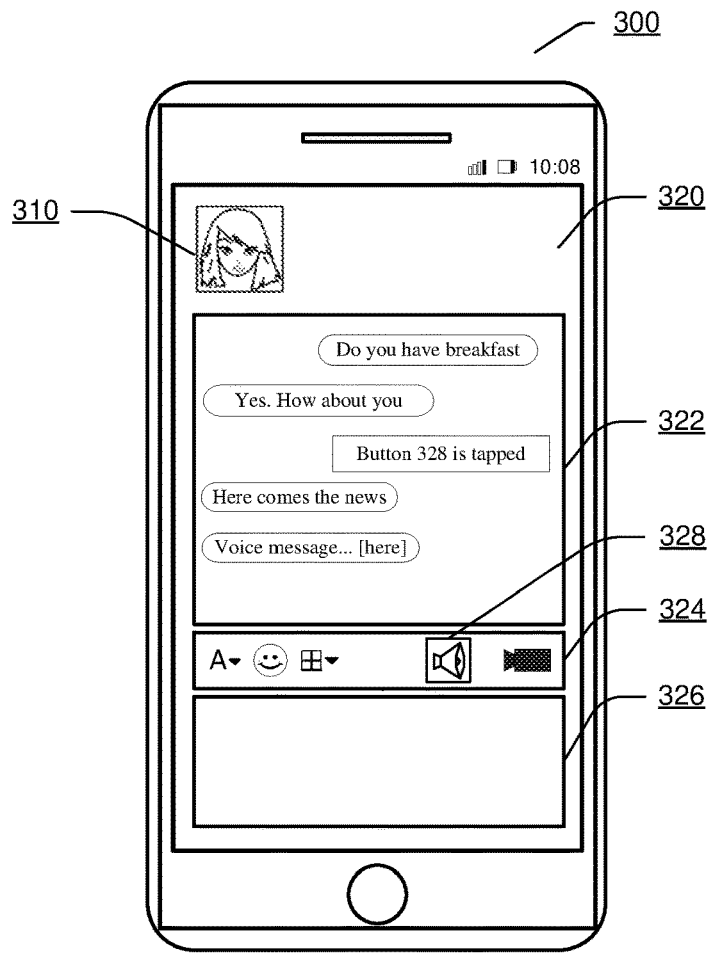
FIGS. 3 and 4 each illustrates an exemplary user interface (UI) according to an embodiment.

FIG. 3 illustrates an example of the UI 210. A chat window 320 is displayed on a computing device 300. The chat window 320 comprises a presentation area 322, a control area 324 and an input area 326. The presentation area 322 presents queries and responses in a conversation between a user and a chatbot, which is represented by the icon 310. The control area 324 includes a plurality of virtual buttons for the user to perform message input settings. For example, the user may make a voice input, attach image file, select emoji symbols, and make a short-cut of current screen, and so on through the control area 324. The control area 324 includes a new virtual button 328 which is used for fast triggering the voice based knowledge sharing application and for fast controlling of the providing of the voice knowledge according to an embodiment. The input area 326 is used for the user to input messages. For example, the user may type text through the input area 326. The control area 324 and the input area 326 may be collectively referred to as an input unit. The user may also make a voice call or video conversation with the AI chatbot though the input unit.

For example, in the UI as shown in FIG. 3, the user inputs a message "do you have breakfast" as a query, and a message "Yes, How about you" may be outputted by the chatbot as a response. After receiving a signal indicating that the user taps or touches the button 328, the chatbot activates the voice knowledge sharing application and outputs a voice message or voice knowledge. It should be appreciated that the terms "voice message" and "voice knowledge" may be used interchangeably herein. It should be appreciated that "Button 328 is tapped" shown in the presentation area 322 of FIG. 3 is used to indicate the user's operation of tapping the fast control button 322, but this message may not be actually outputted in the UI.

Figure 4:
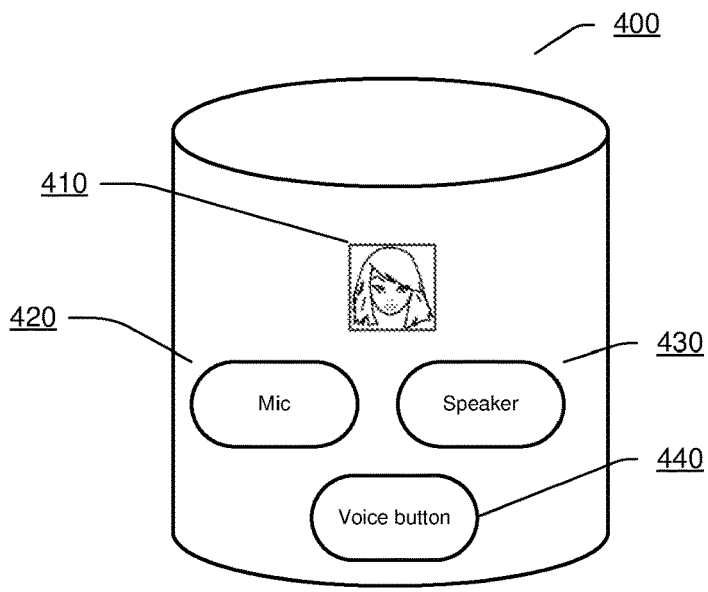

FIG. 4 illustrates a sound box 400 which is an example of the terminal device 120. Although there is no screen on the sound box, the message flow in a conversation as presented in the presentation area 322 of FIG. 3 may be implemented in the form of sound by using the Micphone 420 and speaker 430 as input/output units. The UI 210 is implemented in the form of sound in FIG. 4. The chatbot is represented by the icon 410. The sound box 400 includes a button 410 which is used for fast triggering the voice based knowledge sharing application and fast controlling of the providing of the voice knowledge. For example, after receiving a signal indicating that the user operates the button 410, the chatbot activates the voice knowledge sharing application and outputs a voice message, similarly as described with reference to the button 328 shown in FIG. 3.

The queries from the user are transferred to the query queue 232, which temporarily stores users' queries. The user queries may be in various forms including text, sound, image, video, and so on. Of course the user queries input in the non-visual UI as shown in FIG. 4 are in the form of sound.

The core processing module 220 may take the messages or queries in the query queue 232 as its input. In some implements, queries in the queue 232 may be served or responded in first-in-first-out manner.

The core processing module 220 may invoke processing units in an application program interface (API) module 250 for processing various forms of messages. The API module 250 may comprise a text processing unit 252, a speech processing unit 254, an image processing unit 256, etc.

For a text message, the text processing unit 252 may perform text understanding on the text message, and the core processing module 220 may further determine a text response.

For a speech message, the speech processing unit 254 may perform a speech-to-text conversion on the speech message to obtain text, the text processing unit 252 may perform text understanding on the obtained text, and the core processing module 220 may further determine a text response. If it is determined to provide a response in speech, the speech processing unit 254 may perform a text-to-speech conversion on the text response to generate a corresponding speech response.

For an image message, the image processing unit 256 may perform image recognition on the image message to generate corresponding text, and the core processing module 220 may further determine a text response. For example, when receiving a dog image from the user, the AI chat system may determine the type and color of the dog and further gives a number of comments, such as "So cute German shepherd! You must love it very much". In some cases, the image processing unit 256 may also be used for obtaining an image response based on the text response.

Moreover, although not shown in FIG. 2, the API module 250 may comprise any other processing units. For example, the API module 250 may comprise a video processing unit for cooperating with the core processing module 220 to process a video message and determine a response. For another example, the API module 250 may comprise a location-based processing unit for supporting location-based services.

A voice-based knowledge providing module 280 in the system 200 may implement the function or application for providing voice knowledge to users. A voice database 290 stores prepared voice messages, which may be provided to the user by the voice-based knowledge providing module 280. The voice database 290 may also store prepared text messages, which may converted to voice messages by using a text to speech (TTS) API so as to provide the voice messages to the user by the voice-based knowledge providing module 280. The voice database 290 may also store both the prepared text messages and the converted voice messages. In either of the three cases, the voice messages and/or the text messages may be collectively referred to as knowledge messages.

The core processing module 220 may determine a response through an index database 260 in response to a user query. The index database 260 may comprise a plurality of index items that can be retrieved by the core processing module 220 as responses. The index items in the index database 260 may be classified into a question-answer pair index set 262 and a pure chat index set 264. Index items in the question-answer pair index set 262 are in a form of question-answer pairs, and the question-answer pair index set 262 may comprise question-answer pairs associated with an application such as application 124. It should be appreciated that although the voice database 290 is illustrated as a separate database, the voice database 290 may be implemented as a part of the question-answer pair index set 262, which is associated with the voice-based knowledge providing application implemented at the voice-based knowledge providing module 280.

Index items in the pure chat index set 264 are prepared for free chatting between the user and the chatbot, and may or may not be in a form of question-answer pairs. It should be appreciated that the term question-answer pair may also be referred to as query-response pair or any other suitable terms.

The responses determined by the core processing module 220 may be provided to a response queue or response cache 234. The responses in the response queue or response cache 234 may be further transferred to the user interface 210 such that the responses can be presented to the user in an proper order.

A user database 270 in the system 200 records user data occurred in conversations between users and the chatbot.

The user database 270 may comprise a user log database 272 and a user-application usage database 274.

The user log database 272 records messages occurred in conversations between users and the chatbot. For example, the user log database 272 records user log data of pure chat. For another example, the user log database 272 records not only the user log data of pure chat but also user log data occurred while an application is active. The user log data may be in a query-response pair form, or may be in any other suitable form.

The user-application usage database 274 may be used to store every user's usage information of applications associated with the chatbot or the AI chatting service. The user database 270 may provide information for the voice-based knowledge providing module 280 to prepare voice knowledges in consideration of interests of different user groups.

Figure 5:
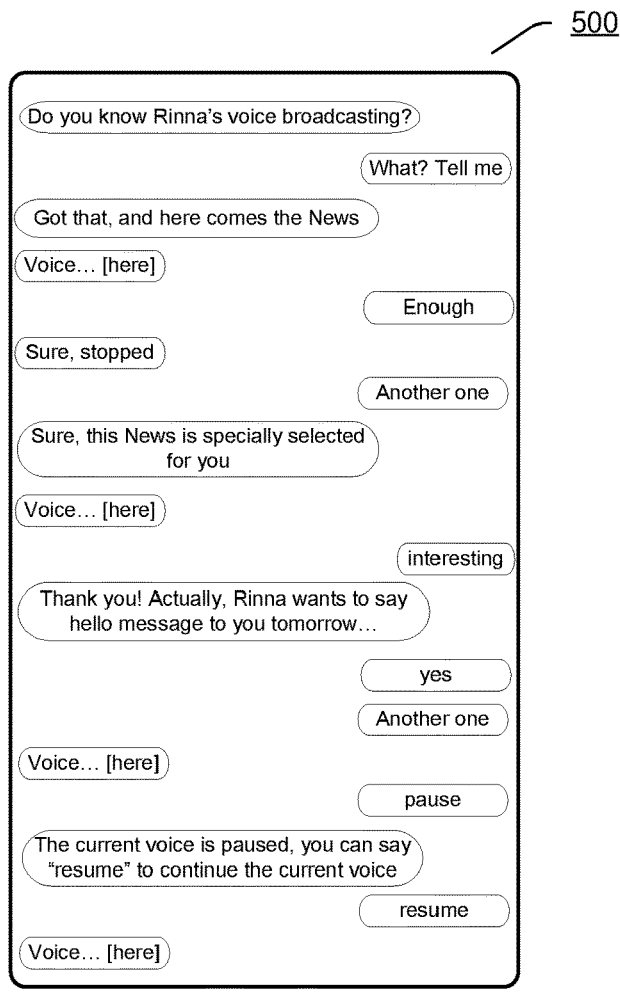
FIGS. 5 to 8 each illustrates an exemplary conversational chatting flow according to an embodiment.

FIG. 5 illustrates an exemplary chatting flow 500 between a user and a chatbot according to an embodiment.

In the chatting flow or conversation, the chatbot proactively recommends the voice-based knowledge providing application to a user, for example, the chatbot presents a message "Do you know Rinna's voice broadcasting?", here Rinna is the name of the chatbot. After receiving a positive answer "tell me" from the user, the application is activated and a voice message is outputted.

The chatbot may select the voice message for the user based on some conditions. For example, the chatbot may identify the user's interest based on historical usage data of the user and select a voice message based on the user's interest. The chatbot may identify a special interest of a user group in which the user belongs to and select a voice message based on the user group's interest. The chatbot may identify the most popular news currently and select a voice message related to the news for the user. The chatbot may select a voice message which is popular in a first user group for a user who is in a second user group but not in the first user group. Sometimes the pushing of voice message in this way would bring unexpected effect for knowledge sharing. It is appreciated that the disclosure is not limited to any specific criteria for selecting a voice message for a user.

When a negative message such as "enough". "stop" or the like is received from the user while the voice message is playing, the chatbot stops the playing of the voice message. When a message such as "another one", "next" or the like is received from the user, the chatbot may output a next voice. When a positive message such as "interesting" is received from the user, the chatbot may recommend providing the voice messages to the user in a proactive way. For example, the chatbot may recommend providing the voice messages daily. The recommendation may be in the way as illustrated in FIG. 5, "Rinna wants to say hello message to you tomorrow". After receiving a positive message such as "yes" in response to the recommendation, the chatbot may set the configuration of the user to provide voice messages or news daily.

When a message such as "pause" is received from the user while a voice message is playing, the chatbot may pause the playing of the current voice message. And the chatbot may resume the playing of the current voice message when receiving a query such as "resume".

Figure 6:
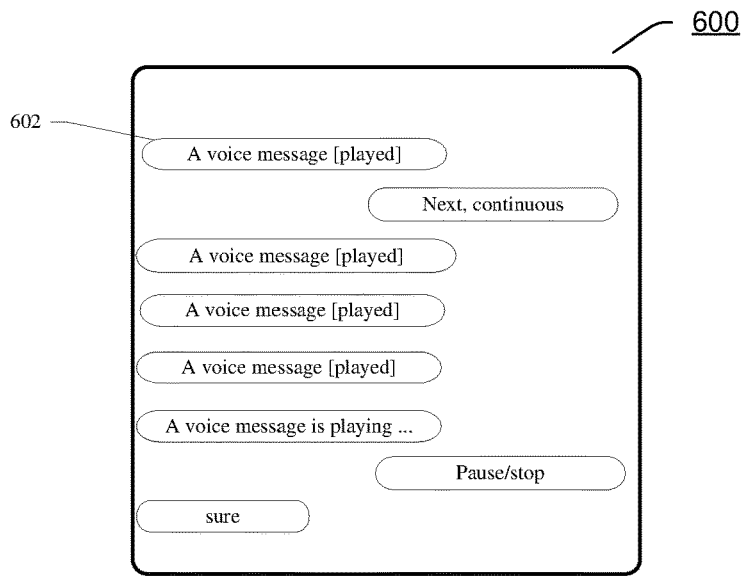

FIG. 6 illustrates an exemplary chatting flow 600 between a user and a chatbot according to an embodiment.

If the recommendation for daily providing voice message is confirmed by the user, a voice message such as the voice message 602 may be presented in the conversation daily, for example, may be presented automatically at 6:00 am every day. When the user taps the voice message 602, or taps the fast control button 328 or 440, the voice message may be played.

When the user inputs a message such as "next, continuous", the following voice messages may be played sequentially until the user's input indicating pause or stop is received. The continuous output of the voice messages may also be implemented as a default setting. For example, after the user tap the first message 602, the message 602 as well as the following messages may be played sequentially until a further user input is received.

Figure 7:
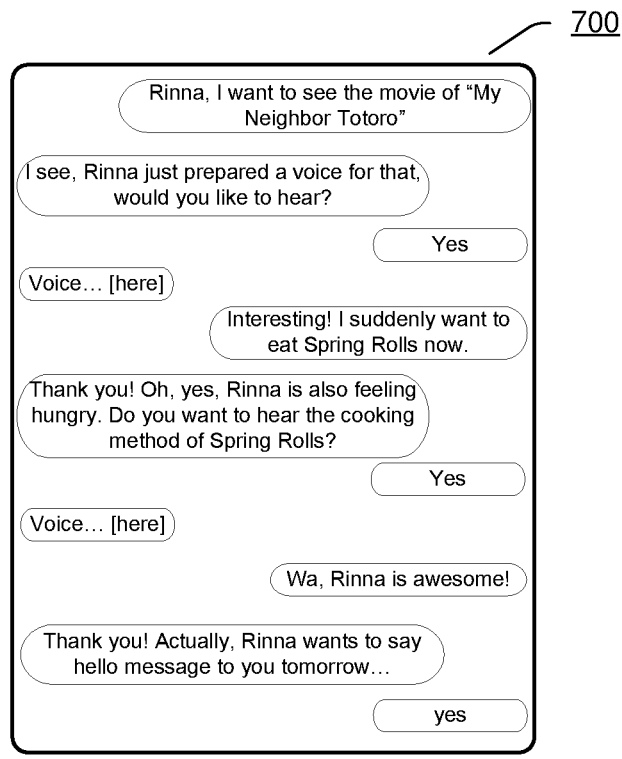

FIG. 7 illustrates an exemplary chatting flow 700 between a user and a chatbot according to an embodiment.

When a user inputs a message "Rinna, I want to see the movie of "My Neighbor Totoro"" in a pure chat mode, the chatbot may identify the keyword "My Neighbor Totoro" which is associated with a voice message in the voice database 290. The chatbot may recommend providing the voice message related to "My Neighbor Totoro" for the user. The chatbot may activate the voice-based knowledge providing application and provide the voice related to "My Neighbor Totoro" after receiving a positive answer "yes" from the user. It should be appreciated that although it's described here that voice messages are stored in the voice database, it's also possible that text messages corresponding to the voice messages are stored in the voice database, and a text message is selected and transformed to the voice before it is output to the user. The voice messages and text messages are examples of knowledge messages in the voice database 290. For sake of simplifying the description, the disclosure is described taking voice messages as the examples of knowledge messages.

Similarly, the chatbot may identify the keyword "spring roll" from the user's input "Interesting! I suddenly want to eat Spring Rolls now". The chatbot may recommend providing the voice message related to "spring roll", and may provide the voice in the conversation after receiving a positive answer "yes".

It should be appreciated that more than one keyword may be associated with one voice message. A keyword of a voice message is not limited to a word level keyword, and may be a phase level keyword or a sentence level keyword. The matching of a user's query and a keyword of a voice message may be implemented by using a similarity scoring module.

Figure 8:
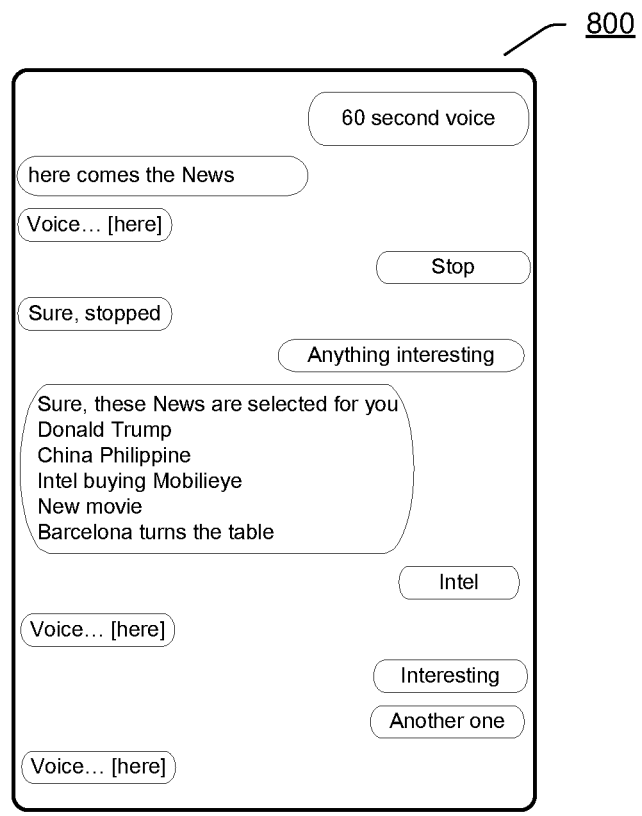

FIG. 8 illustrates an exemplary chatting flow 800 between a user and a chatbot according to an embodiment.

After receiving a user query such as "60 second voice", "voice sharing". "voice news", "new broadcasting" or the like, which are examples of the keyword of the voice based knowledge providing application, the chatbot may activate the voice based knowledge providing application and provide a voice message for the user. When a user query such as "anything interesting" is received while the application is active, the chatbot may output some keywords associated with some voice messages to the user, for example, "Donald Trump", "China Philippine", "Intel buying Mobilieye", "New movie", "Barcelona turns the table" or the like. After receiving the user's input "intel" or "intel buying Mobilieye", the voice message associated with the keyword "intel buying Mobilieye" is output.

The providing of voice messages are illustrated in FIGS. 5-8 as being triggered or controlled based on user inputted queries, either via the visual UI or non-visual UI. The providing of voice messages may be triggered or controlled via the button 328 or 440.

Figure 9:
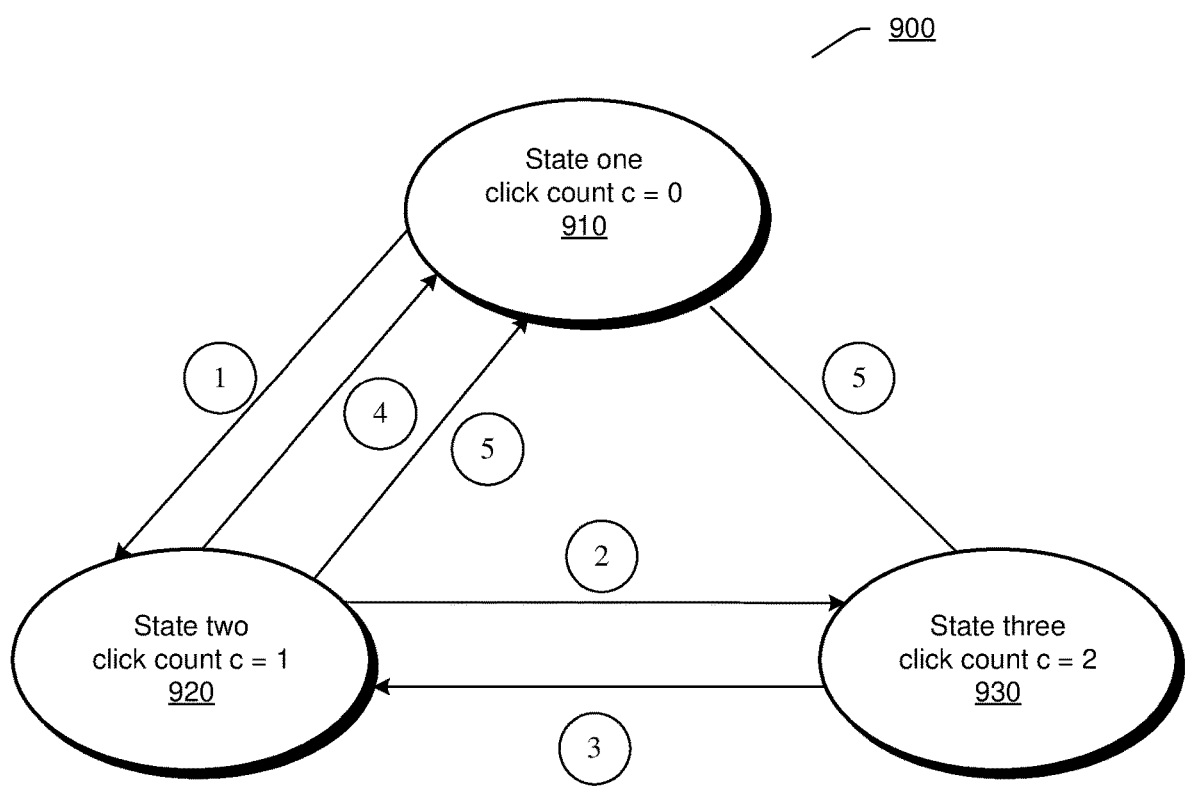
FIG. 9 illustrate an exemplary process for controlling the providing of voice messages via the fast control button according to an embodiment.

FIG. 9 illustrate an exemplary process 900 for controlling the providing of voice messages via the fast control button according to an embodiment.

At state one 910, the voice based knowledge providing application is not activated or no voice message is selected while the application is active. A parameter shown as click count is set to 0 to denote the state one.

As illustrated by the label number 1, after receiving a tap or click on the voice button such as the button 328 or 440, the chatbot selects a voice message for the user and outputs the voice message in a conversation with the user, and the process goes to state two 920, where the current voice message is being played. The click count is set to 1 to denote the state two.

As illustrated by the label number 2, after receiving a click on the voice button during the playing of the current voice, the chatbot pauses the playing of the current voice and the process goes to state three 930. The click count is set to 2 to denote the state three.

As illustrated by the label number 3, after receiving a click on the voice button in the state three, the chatbot resumes the playing of the current voice and the process goes to state two 920.

As illustrated by the label number 4, after the completion of the playing of the current voice, the process goes to state one. It should be appreciated that although it's illustrated by label number 1 that the process would go to state two after receiving a click on the voice button, the chatbot may also automatically select and output the next voice without user's operation based on user setting and go to state two in some other implementations.

As illustrated by the label number 5, after receiving a double click or a long push operation on the voice button in either the state two or the state three, the chatbot stops the current voice and the process goes to state one.

It should be appreciated that the controlling process of FIG. 9 is illustrative without limitation to the disclosure. For example, a double click on the voice button in either the state two or the state three may indicate the providing of next voice message while abandoning the current voice message and the process goes to state two, and a long push operation on the voice button may indicate the interrupt or stop of the current voice message and the process goes to state one.

Figure 10:
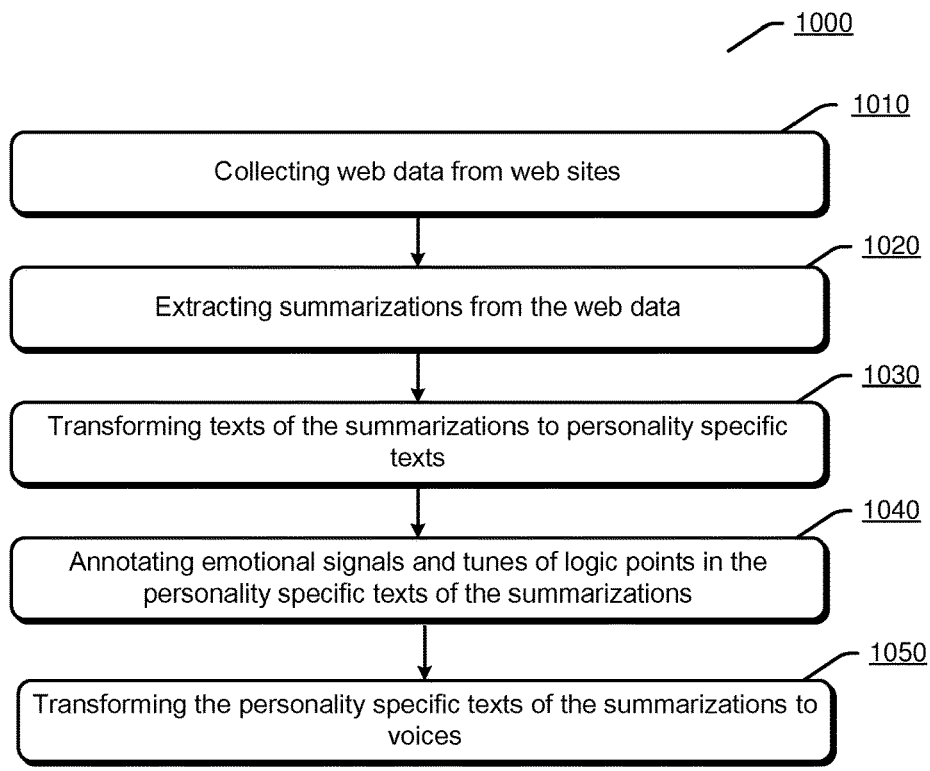
FIG. 10 illustrates an exemplary process for generating knowledge messages according to an embodiment

FIG. 10 illustrates an exemplary process 1000 for generating voice knowledge according to an embodiment.

At 1010, web data are collected from various sources such as various web sites. Examples of the sources include social networks, knowledge-related website, web portals and so on. For example, a spider may be used to collect News from a list of News channels of the web sites. The collected News data are an example of the web data, and the collected News data may include the text, image of the News as well as user's comments about the news. For another example, web data related to various topics such as movie, food, music and so on may be collected from web sites. The collecting of web data may be performed periodically. Taking News mining as an example, the News data collection may be performed daily in order for providing the voice-based News in time.

At 1020, a summarizing process is performed for the web data. Taking a piece of News obtained from a website as an example. Since the content of the News and the comments following the News is usually relatively long, a voice for the whole text including the News content and comments may be too long. The News content and the comments following the News are summarized to ensure the outlines of the News can be covered in a predetermined length of voice, for example, the length of the voice is 60 seconds. In this way, the voice messages or voices corresponding to the knowledge messages may be confined in a predetermined time length.

A machine learning model may be trained to perform the summarization of the web data such as the News. The machine learning model may be referred to as a text summarization model.

In an implementation, a gradient-boosting decision tree (GBDT) model may be trained to score the sentences of a given document such as a News document. The top-N sentences with maximum scores may be selected as the final summarization of the document. The number N of the sentences included in the summarization is determined based on the predefined length of a voice message. To determine the number N, the number of words included in the top-N sentences is ensured to be the closest to be read in the predetermined time length such as 60 seconds. Specifically, the number of words that can be read in the predetermined time length may be determined based on the predefined speed of the voice. Then the number N of sentences in a summarization may be determined in that the number of words in these sentences is closest to but no more than the number of words that can be read in the predetermined time length. Accordingly the voice message transformed from the summarization is close to but no more than the predetermined time length.

In order to construct the training data, given a document such as a News document with a plurality of sentences, people manually annotate a subset of sentences which should be included in the summarization of the document. That is, the selected sentences are assigned with a label of "1", which indicates the selected sentences are positive and should be included in the summarization, and the remaining sentences are assigned with a label of "0", which indicates the remaining sentences are negative and should not be included in the summarization.

To train the GBDT model, for a sentence in a document, at least one of the following features may be used:
1. Is the sentiment analysis (SA) label of current sentence similar with the (average) SA label of the document.
2. The number of words that are shared by current sentence and the title of the News.
3. The number of words that are shared by current sentence and the sentences that are already in the summarization.
4. The length of current sentence (i.e., the number of words).
5. The length difference between current sentence and the average length of the sentences in the document.
6. The length difference between current sentence and the average length of the sentences in current summarization.
7. The (maximum and/or averaged) word2vec similarity between the words in current sentence and the words in the title of the News.
8. The (maximum and/or averaged) word2vec similarity between the words in current sentence and the words in current summarization.
9. The number of shared words between current sentence and the comments of the News (if a word is repeated by a user in a comment, then the word attracts more attention of the user).

It should be appreciated that the features used for the text summarization model are illustrative without limitation to the disclosure, and more or less features may be used to for the text summarization model.

At 1030, the texts of the summarizations are transformed to personality specific texts, which conform to the virtual personality of a chatbot. Examples of the personality include age, gender, career, speaking habit, or the like. In an implementation, the chatbot is designed to be a 17 year old girl. The gender and age related words are important factors to reflect the personality of the chatbot.

In an aspect, the usage of some words may be related to gender and age of a person. For example, in Japanese or German, some words are used in relation to gender and age. For example, "I" in Japanese, a boy can use "僕、俺", yet a girl uses "私、あたし". These words are gender sensitive and cannot be randomly used by different genders.

In another aspect, some written words are not conforming to the personality of a chatbot such as a 17 year old girl. Such written words may be replaced with high-frequency spoken words having the similar meaning. In an implementation, a word2vec model, which represents each word with an vector, may be used to project from written words to spoken words having similar meaning in a sentence. An official word to chatbot word mapping list may be manually built to ensure the transformed text of the summarization is in the chatbot's style.

At 1040, emotional signals and/or tunes of logic points may be annotated in the personality specific texts of the summarizations.

A sentiment analysis (SA) classifier may be used to detect the emotions of the text. For example, the emotions that can be classified by the SA classifier include anger, contempt, disgust, fear, happiness, neutral, sadness, surprise, or the like.

The important words included in the text may be identified during the summarization process as described above. A term frequency and inverse document frequency (TF-IDF) score may be obtained for each word, which may help to identify the important words.

After detection of the emotions and important words of the text, the emotional signals and tunes of logic points may be determined and annotated in the texts of the summarizations. The texts with the emotions and/or logic tones added may be stored in the voice database 270 as the knowledge messages. A knowledge message in text format may be selected in response to a user's input and converted to a voice by a TTS module, so as to output the knowledge voice to the user.

At 1050, the personality specific text such as the age and gender specific text, with the emotional labels and logic tunes attached, is sent to a TTS module to be transformed into a voice conforming to the style of the chatbot. For example, if the chatbot is designed as a 17 year old high school girl, the TTS module is trained with training voices read by similar style people. Therefore the voice transformed from the text may sounds like a teenager girl. The voices and/or the personality specific texts used to generate the voices may be stored in the voice database 290, where each voice and/or each text is stored as a knowledge message in association with a keyword list which may be used to trigger the verbal presentation of the knowledge message.

Figure 11:
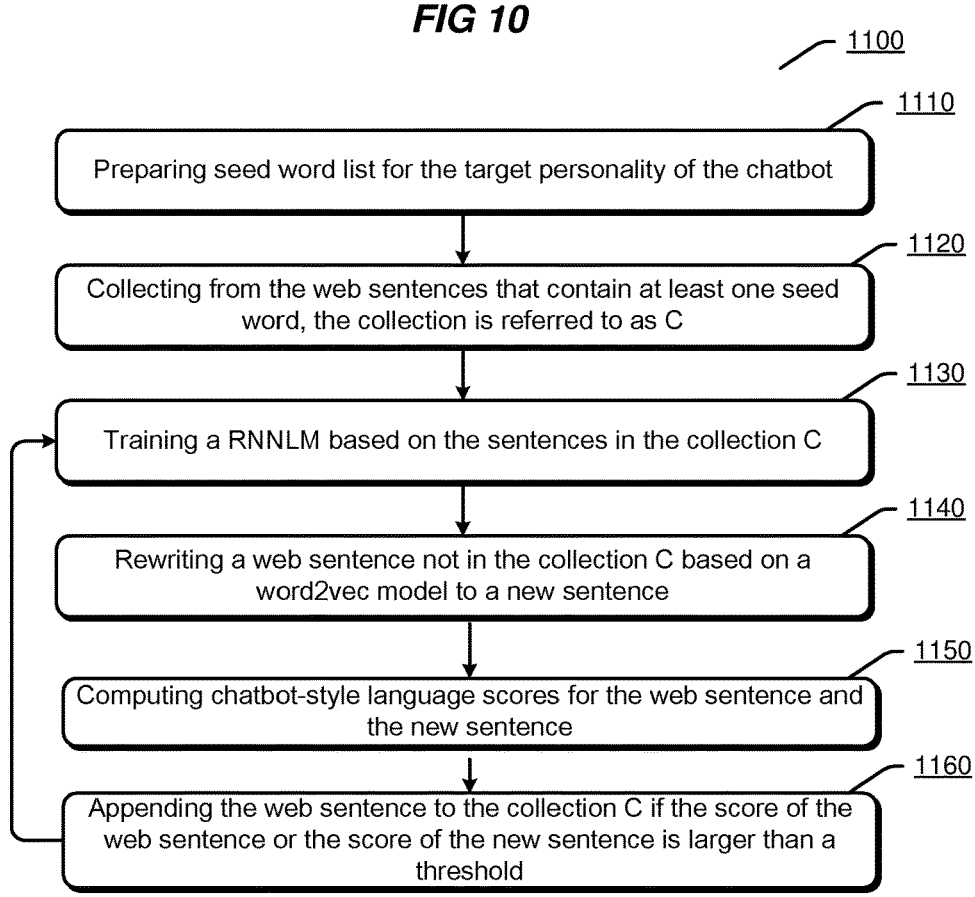
FIG. 11 illustrates an exemplary process for training a language model according to an embodiment.

FIG. 11 illustrates an exemplary process 1100 for training a text transforming model and a chatbot-style language model according to an embodiment. The trained models may be used at 1030 to transform the text of the summarization to the personality specific text.

At 1110, a list of seed words for the target personality or characteristics of the chatbot are prepared. The seed words may be manually collected. An example of the chatbot may be a 17 year old senior high school girl. Examples of the seed words may be "a senior high school girl", "planned to go to the university next year", "applying for a university" and so on.

At 1120, sentences are collected from the web using the list of seed words, that is, a web sentence that contains at least one seed word may be collected, and the collection of the sentences is referred to as C. For example, messages included in social network or News channels may be collected as the sentences.

At 1130, a recurrent neural network language model (RNNLM) is trained based on the collection C. The RNNLM can computes a score for a sentence, the score indicate how much the sentence conforms to the chatbot's language style.

At 1140, a sentence s from the web, which is not included in the collection C, is rewritten using a word2vec model to a new sentence s'.

A word2vec model may be trained to represent each word with an M-dimension (e.g., M=100, 200, or 500) vector, so that the similarity score between each two words may be computed. The word2vec model may be used to retrieve semantically similar words for each seed word in the seed word list. Through this way, a connection (and a replacement candidate) from the normal word (from the web) to the seed word is created. For a sentence or text, if the normal words can be changed to the words frequently used by chatbot, a normal sentence or text may be transformed into the chatbot style sentence or text.

At 1150, chatbot-style language scores for the web sentence s and the new sentence s' are computed using the RNNLM. It should be appreciated that, the replacement candidates are not limited to one during transforming from the normal word to the seed word, thus the RNNLM trained under collection C may be used to evaluate each transforming. The transformed sentence having highest RNNLM score will be picked.

At 1160, if either the score of the web sentence s or the score of the new sentence s' is larger than a threshold, it indicates that the web sentence s is a transformable sentence and the web sentence s is added to the collection C in order to enlarge the collection C.

The operations 1140 to 1160 may be performed for a number of web sentences, and the RNNLM may be trained based on the updated collection C at 1130. The loop of operations 1130 to 1160 may be performed for a number of times in order to train the RNNLM.

The text of a summarization obtained from block 1020 of FIG. 10 may be transformed to the personality specific text in the chatbot style by using the word2vec model and the RNNLM. The personality specific text conforms to the personality such as age, gender or the like of the chatbot. For example, some words or expressions in the text of the summarization of the News are replaced with words or expression frequently used by the chatbot and conforming to the age and gender of the chatbot.

Figure 12:
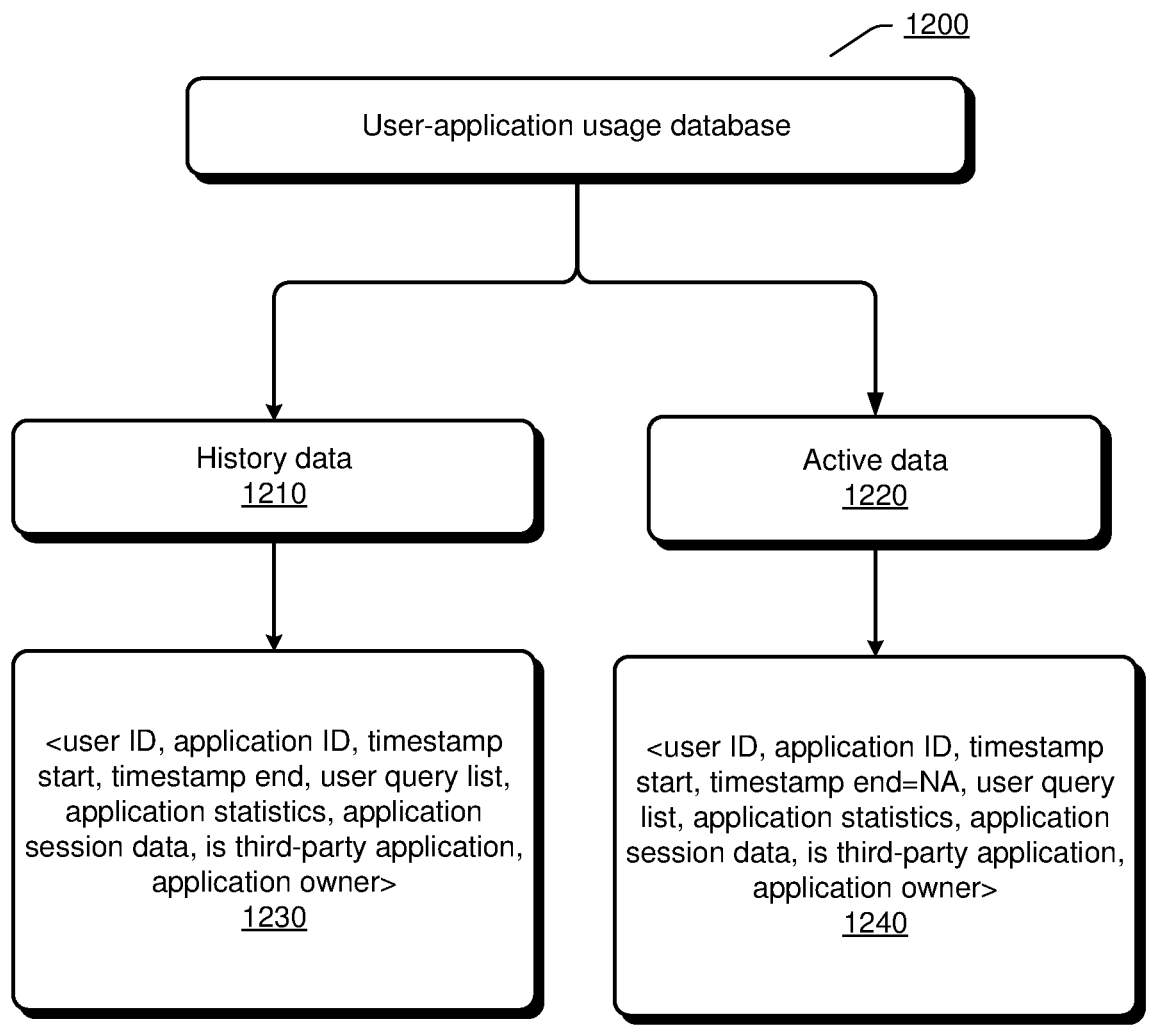
FIG. 12 illustrates an exemplary user-application usage database according to an embodiment

FIG. 12 illustrates an exemplary user-application usage database 1200, which is an example of user-application usage database 274 shown in FIG. 2.

There are two types of data in the database, one is log-style data called history data 1210 that stores the history usage of all applications of all users, the other is active-style data called active data 1220 which records the current active application's statistical information for a specific user, which is identified by a user ID. When the current active application is ended, either by the user or by a timeout exception, the active data 1220 may be stored in the history data unit 1210.

The schema of the history data and the active data are identical as shown in 1230 and 1240, the difference is that some information in the active data is in updating since the active application is still working. For example, the timestamp end information in the active data unit is not available until the current active application is ended.

An exemplary schema of the user-application usage data is illustrated in 1230. The exemplary schema includes user ID, application ID, timestamp start, timestamp end, user query list, application statistics, application session data, is third-party application, application owner. It should be appreciated that more or less information elements may be applicable, and the disclosure is not limited to the specific schema 1230. The timestamp start and timestamp end indicate the start time and end time of the application (identified by application ID) used by the user (identified by user ID). The user query list includes the user's inputted queries for this usage of the application. For example, for a cooking application, the user queries may be "how to cook spring roll", "I want to make sushi" and so on inputted in this usage of the cooking application. The application statistics include statistical information about this usage of the application, such as the number of rounds that the user listened with "60 second voice" application. Examples of the application session data include how many times this application was ended in a normal way, how many times this application was ended in an interrupted way (for example, the application is interrupted by another application). The application session data may be computed with respect to a single user and a single application in some implementations, and may also be computed with respect to a single application and all users in some other implementations. The application session data may be updated periodically. The element of is third part application indicates whether the application identified by the application ID is provided by a third party application provider. The application owner indicates the application provider's information, such as the third-party developer's name or ID.

Figure 13:
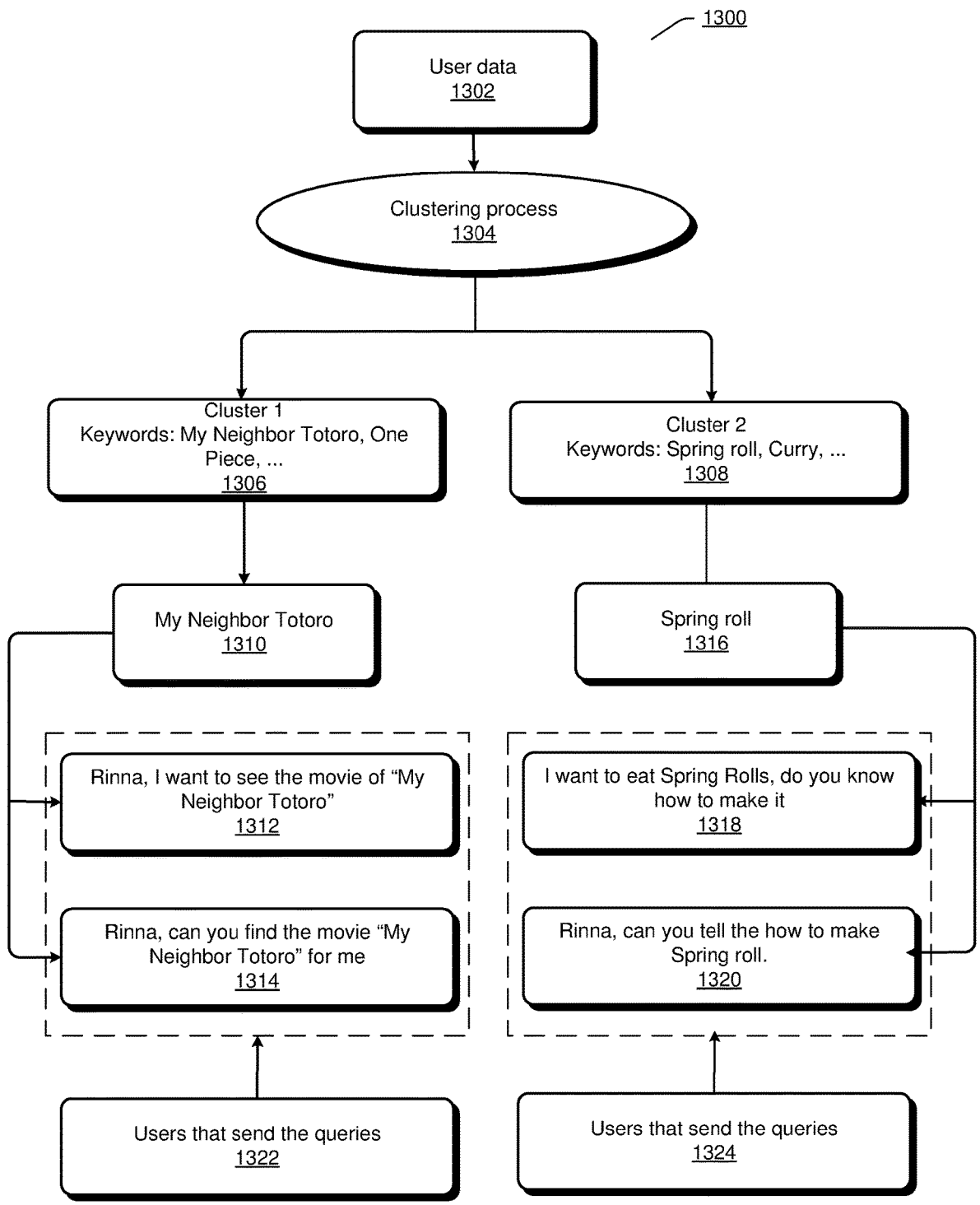
FIG. 13 illustrates an exemplary collection of information from user data according to an embodiment.

FIG. 13 illustrates an exemplary collection 1300 of information from user data according to an embodiment. A user clustering model may be used to automatically cluster users into a number of groups and further link each group with a list of keywords which further is connected with events. The word "event" is to express a group of sentences or sentence-level descriptions that share a common topic keyword. The number of user groups may reflect users' different interests about information.

A Latent Dirichlet allocation (LDA) clustering algorithm may be used at 1304 to automatically cluster user data 1302 into a plurality of clusters such as cluster 1 1306, cluster 2 1308 and so on. The user data 1302 may be user's log data stored in the user log database 272 and/or user-application usage data stored in the user-application usage database 274. In some implementations, all users' log data (e.g., in the form of query-response pairs) and user's queries stored in the user-application stage database are collected as the user data 1302.

In order to make the user data time-sensitive, a discounted weight may be assigned to older user data by a value of $\lambda/n$, where $\lambda$ takes a value of $(0, 1]$ and n is the time distance (e.g., number of months) of the user data till the time of clustering. For example, $\lambda$ may be 0.8 and then for last month's logs of user data, the weight is 0.8 and for logs of user data two months ago, the weight is 0.8/2=0.4. Through this way, ideas collected from the user clustering process may be "fresh".

Each cluster include a list of keywords, such as My Neighbor Totoro, One Piece, . . . , shown at 1306 and Spring roll. Curry, . . . , shown at 1308. It should be appreciated that although two clusters are shown in the FIG. 13, there may be a certain number of clusters, for example the number of clusters may be in hundreds level, thousands level, tens of thousands level, or even millions level. A label may be explicitly defined for each cluster in some implementations. The clusters may just be annotated by integer numbers in some other implementations. Therefore the clustering algorithm may be carried on by only predefining the number of clusters without other configurations.

Each keyword in each cluster is appended with a list of one or more events. An exemplary keyword "My Neighbor Totoro" in cluster 1 is shown at 1310, the keyword "My Neighbor Totoro" is appended with two exemplary events "Rinna, I want to see the movie of "My Neighbor Totoro"" and "Rinna, can you find the movie "My Neighbor Totoro" for me" shown at 1312 and 1314. It should be appreciated that there may be more or less events appended to a keyword. In some implementations, user queries from the user data 1302, which match a keyword of a cluster, may be appended to the keyword of the cluster as the events, and users that sent the queries may be linked to the cluster. Taking the keyword "My Neighbor Totoro" in cluster 1 as an example, a query "Rinna, I want to see the movie of My Neighbor Totoro" contains the keyword "My Neighbor Totoro", then the query is appended to the keyword as the event and accordingly the query as well as users that sent the query is linked with the cluster 1. All the users that send queries containing the keyword of "My Neighbor Totoro" may be included in the cluster 1. Similarly, all the users that send queries containing the keyword of "One Piece" may be included in the cluster 1. Finally all the users that send queries containing any keyword of cluster 1 may be included in the cluster 1.

Moreover, for the voice based knowledge sharing application, in addition to the quires that the users sent, the knowledge voices that the users have heard are also used as the queries in the above user clustering process because the knowledge voices that the users have heard reflect the interests of the users. Also taking the keyword "My Neighbor Totoro" in cluster 1 as an example, users who have listened voice messages containing the keyword "My Neighbor Totoro" would be grouped in the cluster 1.

The user clustering model is designed to better understand the frequently used words and frequently attended events by large-scale users. And the information collected by the user clustering is helpful for prepare voice knowledge for different user groups having different interests.

Figure 14:
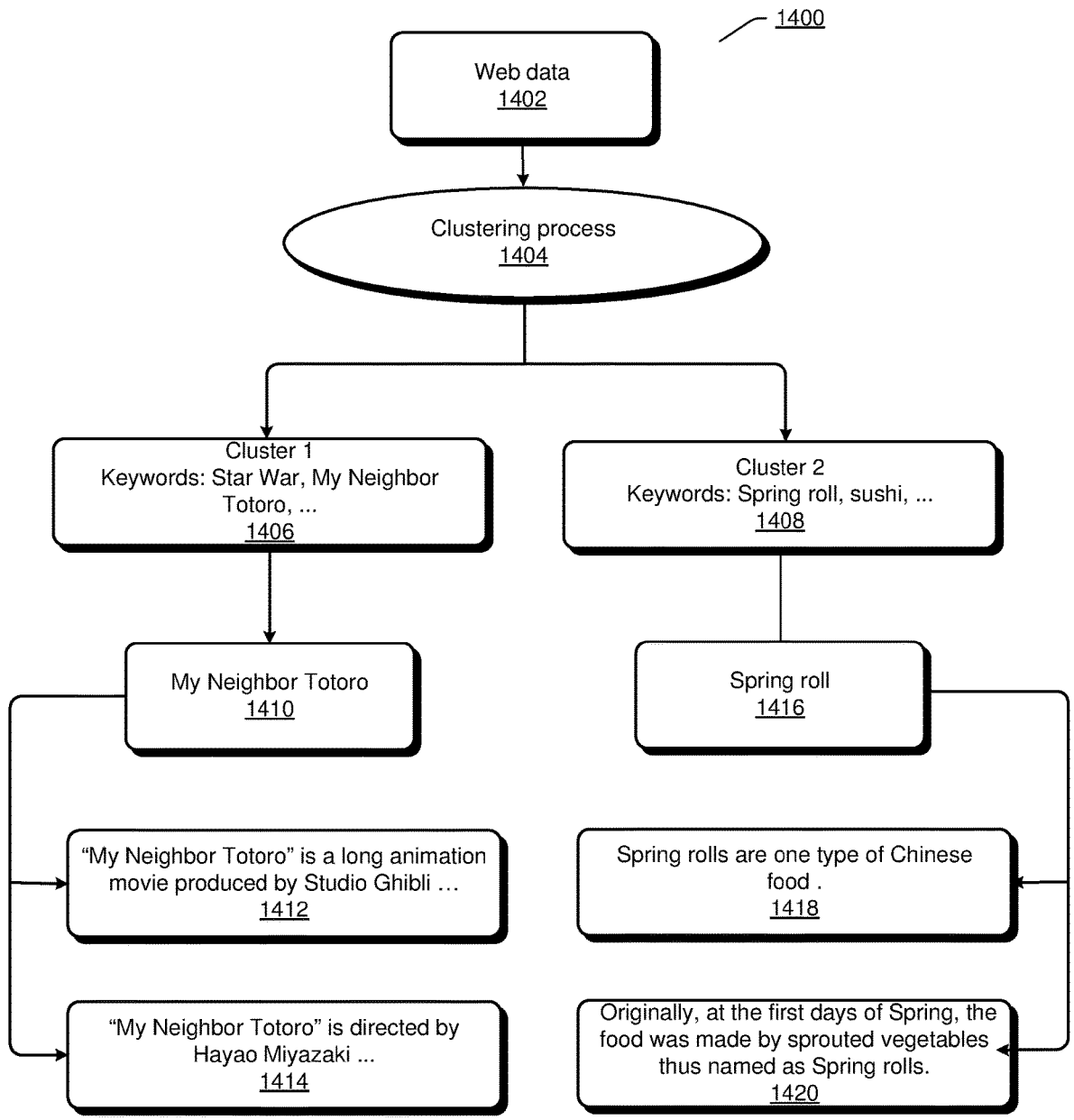
FIG. 14 illustrates an exemplary collection of information from web data according to an embodiment.

FIG. 14 illustrates an exemplary collection 1400 of information from web data according to an embodiment.

A LDA clustering model may be used at 1404 to automatically cluster web data 1402 into a plurality of clusters such as cluster 1 1406, cluster 2 1408 and so on. The web data 1402 may be from various web resources, examples of which may include web portals, social networks, knowledge-related website and so on. Examples of the web data 1402 may include News from web sites, knowledge-related contents from web sites and so on.

Each cluster include a list of keywords, such as Star War, My Neighbor Totoro, . . . shown at 1406 and Spring roll, sushi . . . , shown at 1408. It should be appreciated that although two clusters are shown in the Figure, there may be a certain number of clusters, as discussed above.

Each keyword in each cluster is appended with a list of one or more events. An exemplary keyword "My Neighbor Totoro" in cluster 1 is shown at 1410, the keyword "My Neighbor Totoro" is appended with two exemplary events ""My Neighbor Totoro" is a long animation movie produced by Studio Ghibli." and ""My Neighbor Totoro" is directed by Hayao Miyazaki." shown at 1412 and 1414. It should be appreciated that there may be more or less events appended to a keyword. In some implementations, sentence level descriptions (such as sentences 1412, 1414 or sentences 1418, 1420) from the web data 1402, which match a keyword of a cluster, may be appended to the keyword of the cluster as the events, and accordingly the events as well as documents from the web data that contains at least one of the events are linked with the cluster 1. As illustrated, the sentences 1412 and 1414 are appended to the keyword 1410 in the cluster 1, and the sentences 1418 and 1420 are appended to the keyword 1416 in the cluster 2, and the web documents containing one of the sentences 1412 and 1414 are linked to the cluster 1, the web documents containing one of the sentences 1418 and 1420 are linked to the cluster 2. The web documents are data obtained from the web sites, and examples of the web documents include News (for example, the New document may include both the content of the News and the user comments of the News), knowledge related articles, and so on.

Figure 15:
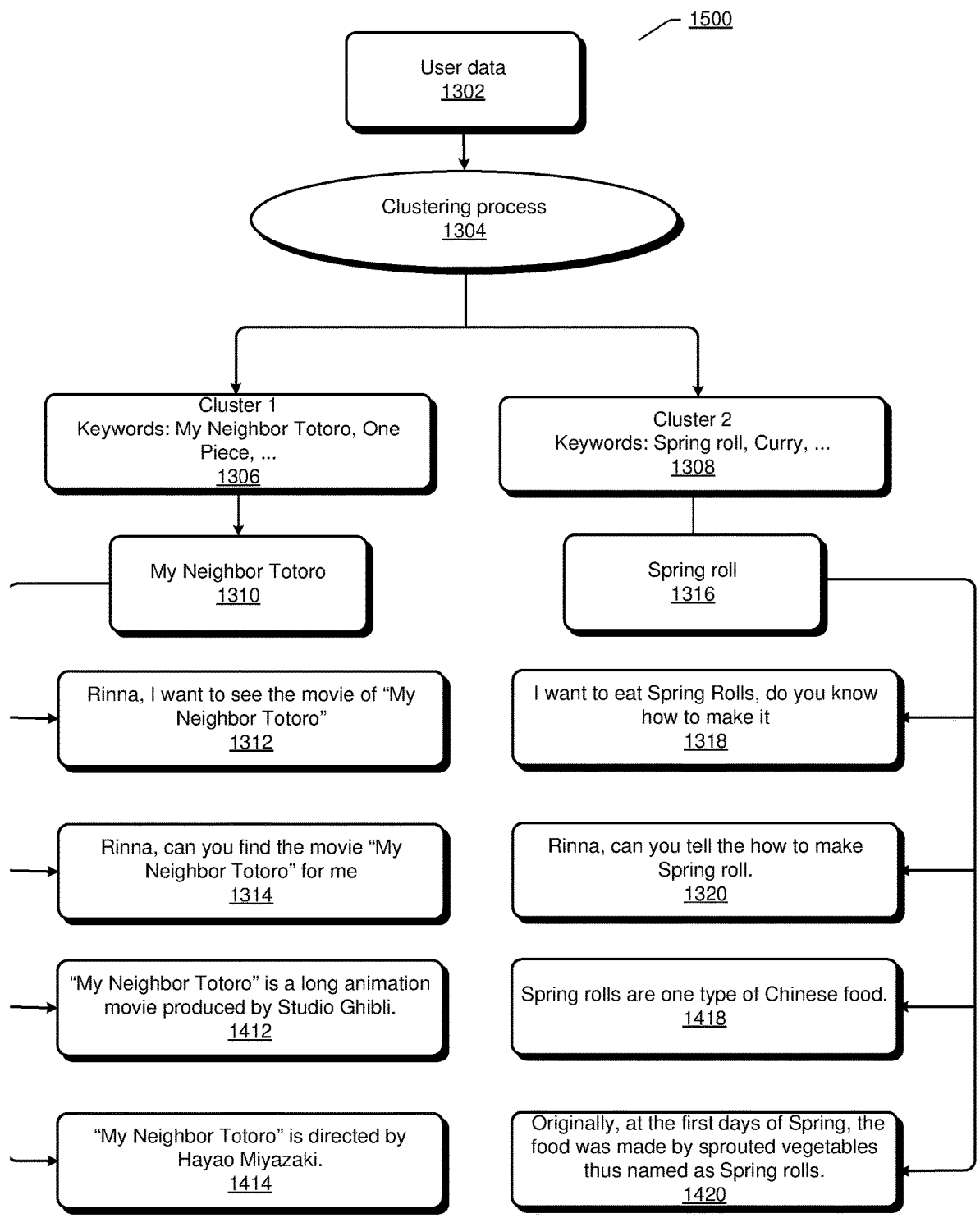
FIG. 15 illustrates an exemplary link of user data and web data according to an embodiment.

FIG. 15 illustrates an exemplary link 1500 of user clusters and web cluster according to an embodiment. The same label numbers shown in FIGS. 13-15 denote same elements.

After generating a list of user clusters from user data as shown in FIG. 13 and a list of web clusters from web data as show in FIG. 14, similar clusters in these two lists of clusters may be unified. For example, as shown in FIG. 15, if a keyword (e.g., "My Neighbor Totoro" 1310) is shared by a cluster in the user cluster list (e.g., cluster 1 in the user cluster list) and a cluster in the web cluster list (e.g., cluster 1 in the web cluster list), then the events (e.g., events 1412, 1414) appended to the keyword in the web cluster may be linked to the events appended to the keyword in the user cluster. This linking is meaningful, since user's intention of requirement is mostly included in the events from the user and the events from the web may supply materials for preparing knowledge for user's special intentions, which is identified by the keywords. Accordingly, the disclosure builds new "query-knowledge pairs" making use of these data where a query is from users and knowledge summarizations/outlines are from the web. In this way, the disclosure actually selects knowledges for different user groups in consideration of the interests of the user groups.

In some implements, a query-knowledge similarity score computing model is used to find high confidence knowledges from web data for queries from user data. An exemplary algorithm of the model is as follows.

For each user cluster Cu in user cluster list:
Find web cluster Cw in web cluster list so that Cw shares the maximum number of keywords with Cu;
For each query Qu that is connected with Cu:
$sim_{max}(Qu, Dw)=0$;
For each document Dw that is connected with Cw:
Compute the similarity score sim(Qu, Dw) and record the Dw if $sim(Qu, Dw) > sim_{max}(Qu, Dw)$;
$sim_{max}(Qu, Dw)=sim(Qu, Dw)$;
If $sim_{max}(Qu, Dw) >= threshold$
Take (Qu, Dw) as a <query, document> candidate pair.

The sim(Qu, Dw) denotes the similarity score between Qu and Dw, $sim_{max}$(Qu, Dw) denotes the maximum similarity score. A machine learning module, for example, a gradient boosting decision tree, may be trained for computing the similarity score sim(Qu, Dw), which indicates how good the document responds to a query. The query Qu is an event in the user cluster Cu. and the document Dw is an above mentioned web document or an above mentioned summarization of the web document, which is linked to the web cluster Cw. The threshold is a predefined value, an example of the threshold may be 0.5, where the sim(Qu, Dw) ranges from 0 to 1.

It should be appreciated that the above algorithm is illustrative without limitation to the scope of the disclosure and suitable modification may be made to the algorithm. It should be appreciated that the finding of candidate query-document pairs may be performed based on user data and web data periodically. Taking News as an example of the voice knowledge, the updating of the query-document pairs may be performed daily.

Figure 16:
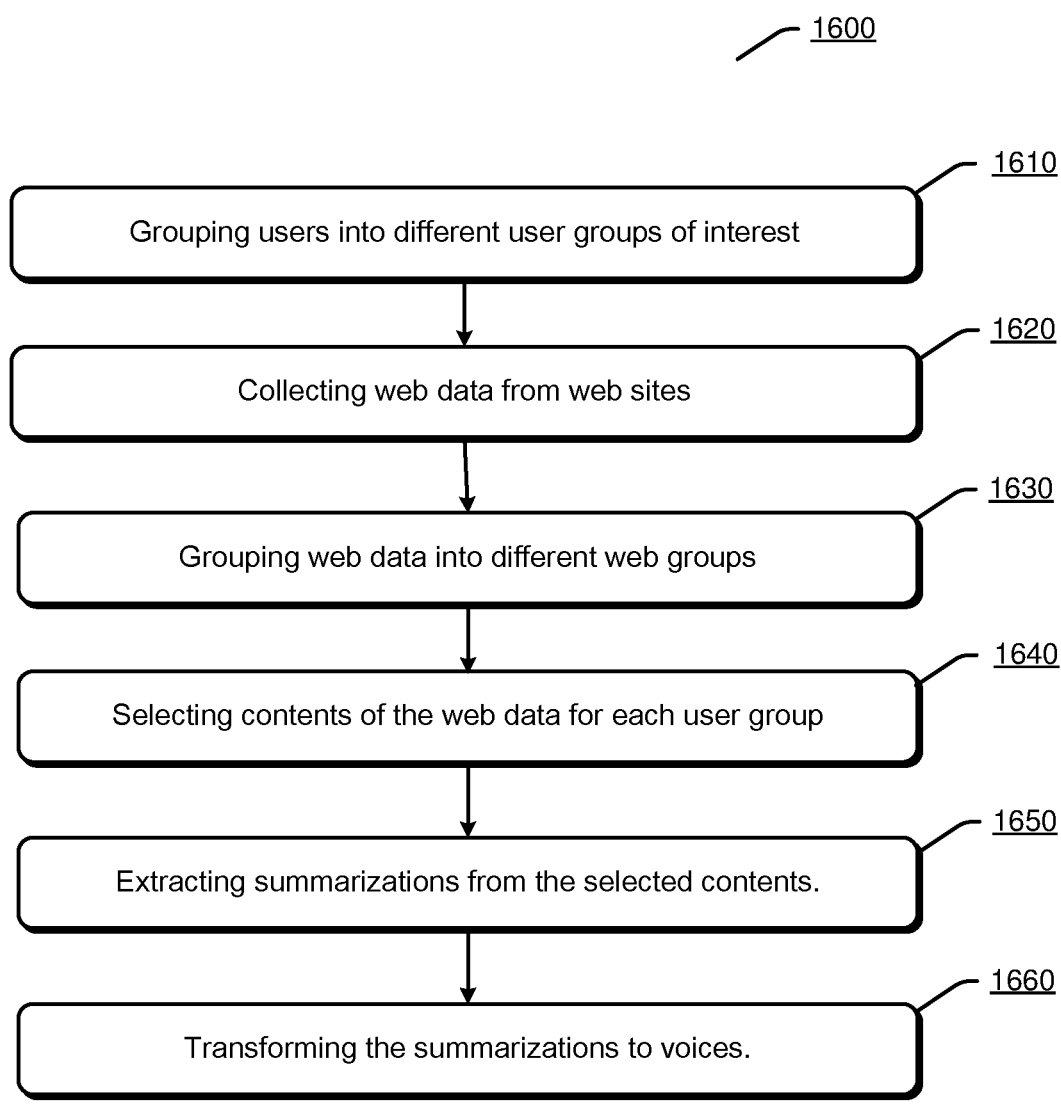
FIG. 16 illustrates an exemplary process for generating knowledge messages according to an embodiment.

FIG. 16 illustrates an exemplary process 1600 for generating voice knowledge according to an embodiment.

At 1610, users are grouped into user groups based on user data, as exemplarily detailed in FIG. 13.

At 1620, web data are collected from various sources such as various web sites. For example, a spider may be used to collect News from a list of News channels of the web sites in order for providing the voice-based News. It should be appreciated that News is also an example of so called knowledge in this disclosure.

At 1630, web data are grouped into web groups, as exemplarily detailed in FIG. 14, where contents or documents of the web data are linked to respective web groups through the grouping of the web data.

At 1640, contents or documents of the web data are selected for each user group. Exemplary process for selecting the contents or documents for user groups is illustrated above with reference to FIG. 15. Taking News as an example, through the selecting process, News including the News content itself and/or comments of the News are linked to different user groups based on users' interests.

At 1650, a summarizing process is performed for the selected contents or documents of the web data, as exemplarily detailed in 1020 of FIG. 10.

At 1660, the summarizations of the selected contents or documents are transformed into voice messages. The voice messages may be stored as the knowledge messages in the voice database in association with a keyword list. In an implementation, the summarizations may be directly transformed into voices at a TTS module. In another implementation, the summarization to voice transformation process at 1660 may include the processes of 1030 to 1050, so as to obtain voices conforming to the virtual personality of the chatbot. In another implementation, the texts of the summarizations may be stored as the knowledge messages in the voice database in association with a keyword list.

It should be appreciated that the process illustrated in FIG. 16 is illustrative without limitation to the scope of the disclosure and suitable modification may be made to the algorithm. The order of the steps 1610 to 1630 is not fixed and may be performed in parallel. In an variation of the process illustrated in FIG. 16, the summarizing process may be performed for all the documents of the web data after collecting the documents from the web sites, then selection process at 1640 may be performed based on the summarizations of the web documents, and the step 1650 is not necessary accordingly.

Figure 17:
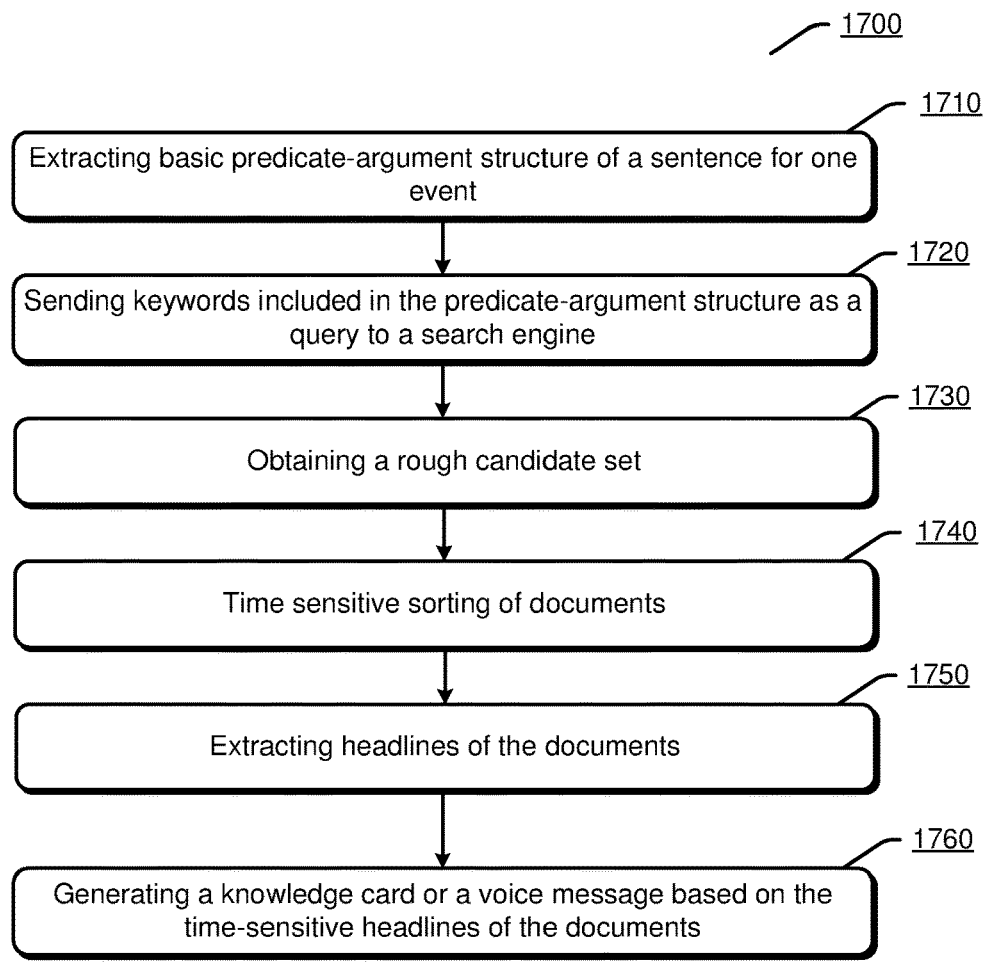
FIG. 17 illustrates an exemplary process for generating an event browsing knowledge according to an embodiment.

FIG. 17 illustrates an exemplary process 1700 for generating an event browsing knowledge according to an embodiment.

At 1710, a basic predicate-argument structure may be extracted for a seed sentence for one event, such as the event shown in FIG. 14. For example, in a sentence of "Windows 95 was released", the extracted predicate-argument structure is "<object argument=Windows 95, predicate=release>".

At 1720, keywords included in the predicate-argument structure are taken as a query to send to a search engine such as Bing or the like.

At 1730, a rough candidate set may be obtained from the search results. For example, the top-N (e.g., N=10, or 100) results from the search engine may be taken as the rough candidate set.

At 1740, a time sensitive sorting is performed to the documents in the rough candidate set, to obtain the documents related to the event in a time line.

At 1750, the text summarization module may be used to extract only the title and headlines of the documents to make the final result to be highly summarized.

Figure 18:
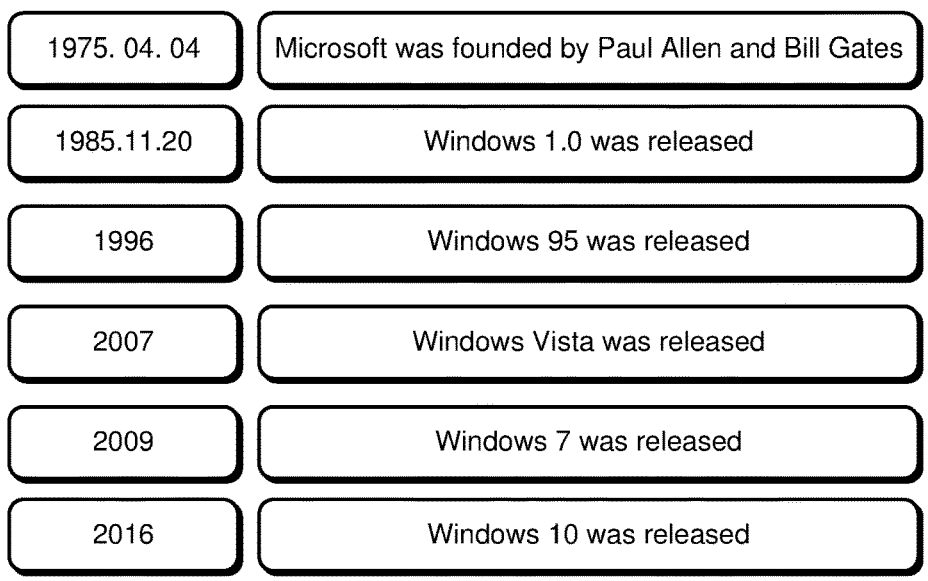
FIG. 18 illustrates an exemplary event browsing knowledge according to an embodiment.

At 1760, a list with limited number of document headlines attached with time points may be obtained as the event browsing knowledge. FIG. 18 illustrates such a list 1800 taking "Windows 95 was released" as the seed sentence. This list may be formulated in a knowledge card or may be transformed into a voice message, so as to be presented to the users in the conversation of the AI chatting. The time-sensitive knowledges from the web may help end users understand the events related to one entity name, such as personal name, place name, company name and so on.

It should be appreciated that in addition to obtain time sensitive headlines of an event as the event browsing contents, contents related to a hot topic at a similar time point may also be obtained as the event browsing contents. For example, for a hot topic "US president election", relevant contents at a similar time points may be obtained and summarized to formulate a list with headlines of the relevant contents. Then the list may be formulated in a knowledge card or may be transformed into a voice message, so as to be presented to the users in the conversation of the AI chatting.

Figure 19:
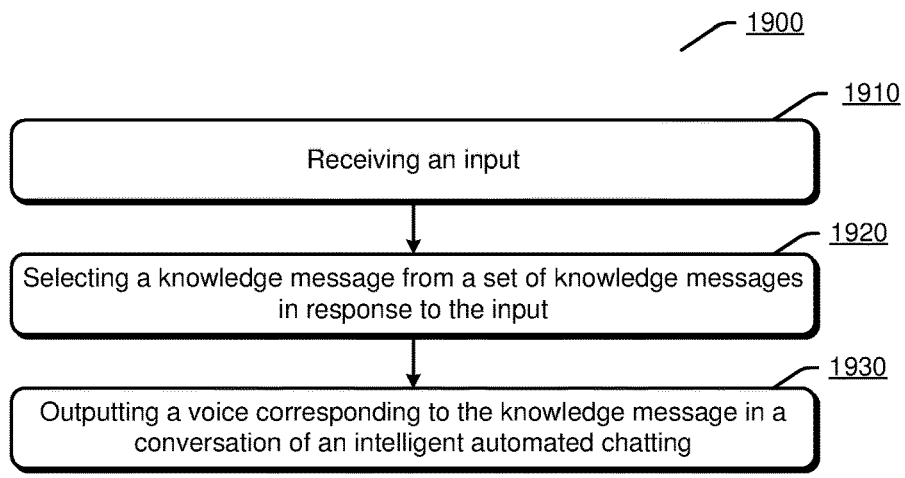
FIG. 19 illustrates an exemplary process for providing voice-based knowledge through intelligent automated chatting according to an embodiment.

FIG. 19 illustrates an exemplary process 1900 for providing voice-based knowledge through intelligent automated chatting.

At 1910, an input is received at the AI chatting system or the chatbot. For example, the input may be a query received from a user in the conversation. The query may be matching a keyword of a voice-based knowledge providing application according to an embodiment. The query may be matching a keyword for a voice message that may be provided by the application. For another example, the input may be a signal indicating an operation on the fast control button 328 or 440 shown in FIG. 3 or 4.

At 1920, a knowledge message is selected from a set of knowledge messages in response to the input, where the length of a voice corresponding to each of the set of knowledge messages is no more than a predefined length and preferably close to the predefined length such as 60 seconds. The set of knowledge messages are in the form of voices or texts.

At 1930, a voice corresponding to the selected knowledge message is output in a conversation of the intelligent automated chatting.

In an implementation, each of the set of knowledge messages conforms to a virtual personality of a chatbot. In a first aspect, the content of the knowledge message is in the chatbot's style, where frequently spoken words of the chatbot are employed to replace normal words having similar meanings in the original content of the knowledge messages. In a second aspect, the speaking manner such as tone of the voice corresponding to the knowledge message is in the chatbot's style, such as the speaking style of a 17 year old high school girl.

In an implementation, a second input may be received, and at least one of the following may be performed in response to the second input: outputting a next voice corresponding to a next knowledge message; outputting multiple voices corresponding to multiple knowledge messages sequentially; recommending to push the knowledge messages proactively; outputting at least one keyword associated to at least one knowledge message; pausing the playing of the voice during which the second input is received or resuming the playing of the paused voice; or stopping the playing of the voice.

In an implementation, the chatbot may proactively output keywords associated with voices or knowledge messages to the user. For example, the chatbot may output keywords that may be interested by a user in a conversation with the user, and the user may select one of the keywords to trigger the providing of an associated knowledge message by the chatbot. If the user is not interested with the pushed keywords and the user's query is about switching to another topic or keyword, the chatbot may reformulate keywords for the user and push the keywords to the user. In this way, the user may be recommended for his possibly interested voice messages.

In an implementation, the knowledge message is selected at 1920 based on a matching of the input and a keyword associated with the knowledge message, wherein each of the set of knowledge messages is associated with at least one keyword.

In an implementation, the knowledge message may be selected at 1920 based on at least one of the historical usage data of the user, historical usage data of a user group to which the user belongs, and ranking of the knowledge messages.

In an aspect, topics that the user accessed recently may be a good clue for selecting the knowledge message for the user. For example, a knowledge message about releasing of new music may be provided for a user who accessed music data frequently or recently.

In another aspect, knowledge messages such as those related to News may be ranked based on the News themselves, and may be selected to the user based on the ranking.

In another aspect, the interest of a user group may reflect the interest of the users in the group, and thus the historical usage data of a user group is also a good clue for selecting the knowledge message for the user in the user group.

In another aspect, a knowledge message which is matched with the usage habit of the user may be selected for the user. For example, knowledge messages linked to a specific user group may be selected for the users in the user group because the knowledge messages meet the interest of the user group. On the other hand, a knowledge message which is not matched with the usage habit of the user may be selected for the user. For example, knowledge messages linked to a first user group may be selected for the users in a second user group. Such a cross-group pushing of knowledge messages may bring user a broader selection of knowledge messages although some knowledge messages are not linked to the user groups to which the user belong. In this case, a relative distance between each pair of user groups may be computed for performing the cross-group pushing. An example of the relative distance may be the number of users shared in these user groups. The cross-group pushing of knowledge messages may be more likely to have good result taking the group distance into account. For example, knowledge messages linked to a user group being interested in movie would be more acceptable for a user group being interested in music, therefore the cross-group pushing between such user groups are more likely to be acceptable for the users as the distance between the two groups is relatively close.

In an implementation, at least a part of the set of knowledge messages are generated based on web data or based on both web data and user data.

In an implementation, in the process of generating the at least a part of the set of knowledge messages, summarizations are extracted from contents of the web data, where each of the summarizations include a number of sentences, the number of sentences in each summarization is determined based on the predefined length of a voice.

The summarizations may be transformed to the set of voice messages conforming to a virtual personality of a chatbot, such as age and gender designed for the chatbot. In an implementation, texts of the summarizations are changed to texts conforming to the virtual personality of the chatbot, and/or the changed texts of the summarizations are transformed to the part of the set of voices conforming to virtual personality of the chatbot. Either the changed text or the voices or both may be stored in the voice database as the knowledge messages.

In an implementation, a plurality of user groups are generated based on the user data and a plurality of web groups are generated based on the web data. Contents such as News are selected from the web data for each of the user clusters based on the plurality of user groups and the plurality of web groups. The at least part of the plurality of knowledge messages are generated by transforming summarizations of the selected contents to the at least part of the plurality of knowledge messages.

In an implementation, multiple contents which are related to a topic along a time line or at a similar time point are generated, and a voice message or a knowledge card is generated by using summarizations of the multiple contents which are related to the topic.

Figure 20:
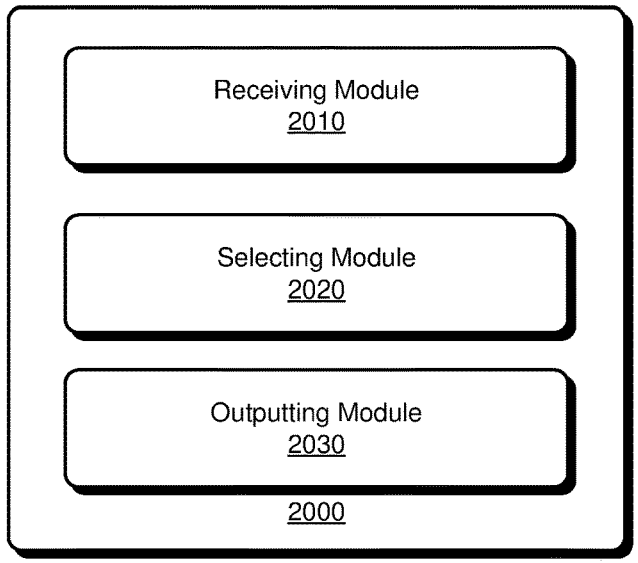
FIG. 20 illustrates an exemplary apparatus for providing voice-based knowledge through intelligent automated chatting according to an embodiment.

FIG. 20 illustrates an exemplary apparatus 2000 for providing voice messages through intelligent automated chatting according to an embodiment.

The apparatus 2000 comprises a receiving module 2010, a selecting module 2020 and an outputting module 2030. The receiving module 2010 is configured to receive an input. The selecting module 2020 is configured to select a knowledge message from a set of knowledge messages in response to the input, wherein a length of a voice corresponding to each of the set of knowledge messages is no more than a predefined length. The outputting module 2030 is configured to output a voice corresponding to the knowledge message in a conversation of the intelligent automated chatting. The set of knowledge messages are in the form of voices or texts.

In an implementation, each of the set of knowledge messages conforms to a virtual personality of a chatbot.

In an implementation, the receiving module 2010 is configured to receive a query as the input in the conversation. In an implementation, the receiving module 2010 is configured to receive a signal indicating an operation on a control button as the input.

In an implementation the receiving module 2010 is configured to receive a second input. The outputting module 2030 is configured to perform at least one of the following in response to the second input: outputting a next voice corresponding to a next knowledge message; outputting multiple voices corresponding to multiple knowledge messages sequentially; recommending to push the knowledge messages proactively; outputting at least one keyword associated to at least one knowledge message; pausing the playing of the voice during which the second input is received or resuming the playing of the paused voice; or stopping the playing of the voice.

In an implementation, the selecting module 2020 is configured to select the knowledge message based on a matching of the input and a keyword associated with the knowledge message, wherein each of the set of knowledge messages is associated with at least one keyword.

In an implementation, the selecting module 2020 is configured to select the knowledge message based on at least one of the historical usage data of the user, historical usage data of a user group to which the user belongs, and ranking of the knowledge messages.

In an implementation, the selecting module 2020 is configured to select the knowledge message which is matched with the usage habit of the user.

In an implementation, the selecting module 2020 is configured to select the knowledge message which is not matched with the usage habit of the user.

In an implementation, the apparatus 2000 comprising a generating module configured to generate at least a part of the set of knowledge messages based on web data or both web data and user data.

In an implementation, the generating module is configured to extract summarizations from contents of web data, wherein each of the summarizations include a number of sentences, the number of sentences in each summarization is determined based on the predefined length of a voice.

In an implementation, the generating module is configured to transform the summarizations to voices as the set of knowledge messages conforming to a virtual personality of a chatbot.

In an implementation, the generating module is configured to change texts of the summarizations to texts conforming to the virtual personality of the chatbot, and/or transform the changed texts of the summarizations to voices conforming to virtual personality of the chatbot.

It should be appreciated that the apparatus 2000 may also comprise any other modules configured for performing any operations of the methods for providing voice-based knowledge according to the various embodiments as mentioned above in connection with FIGS. 1-19.

Figure 21:
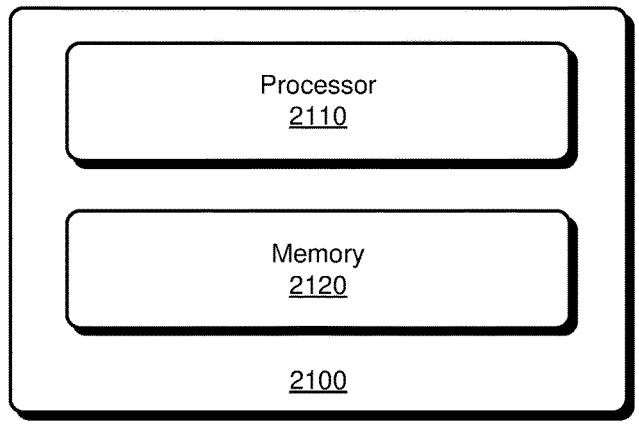
FIG. 21 illustrates an exemplary computing system according to an embodiment.

FIG. 21 illustrates an exemplary computing system 2100 according to an embodiment.

The system 2100 may comprise one or more processors 2110. The system 2100 may further comprise a memory 2120 that is connected with the one or more processors 2110.

The memory 2120 may store computer-executable instructions that, when executed, cause the one or more processors 2110 to receive an input, select a knowledge message from a set of knowledge messages in response to the input, wherein a length of a voice corresponding to each of the set of voice messages is no more than a predefined length, and output a voice corresponding to the knowledge message in a conversation of the intelligent automated chatting.

It should be appreciated that the computer-executable instructions, when executed, cause the one or more processors 2110 to perform any operations of the processes according to the embodiments as mentioned above in connection with FIGS. 1-20.

The embodiments of the present disclosure may be embodied in a non-transitory computer-readable medium. The non-transitory computer-readable medium may comprise instructions that, when executed, cause one or more processors to perform any operations of the processes according to the embodiments as mentioned above.

It should be appreciated that all the operations in the processes described above are merely exemplary, and the present disclosure is not limited to any operations in the processes or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing voice-based knowledge through intelligent automated chatting, comprising:
   generating at least a part of a set of knowledge messages based on web data or based on both the web data and user data by extracting summarizations from contents of the web data, wherein each of the summarizations include a number of sentences, wherein a number of sentences in each summarization is determined based on a predefined length of a voice;
   receiving an input;
   selecting a knowledge message from the set of knowledge messages in response to the input, wherein a length of a voice corresponding to each knowledge message of the set of knowledge messages is no more than the predefined length; and
   outputting a voice corresponding to the selected knowledge message in a conversation of the intelligent automated chatting.

2. The method of claim 1, wherein the set of knowledge messages are in the form of voices or texts.

3. The method of claim 2, wherein each knowledge message of the set of knowledge messages conforms to a virtual personality of a chatbot.

4. The method of claim 1, wherein the receiving an input comprises one of the following:
   receiving a query in the conversation; or
   receiving a signal indicating an operation on a control button.

5. The method of claim 1, further comprising:
   receiving a second input; and
   performing at least one of the following in response to the second input:
      outputting a next voice corresponding to a next knowledge message;
      outputting multiple voices corresponding to multiple knowledge messages sequentially;
      recommending to push knowledge messages proactively;
      outputting at least one keyword associated to at least one knowledge message;
      pausing playing of the voice during which the second input is received or resuming the playing of the voice; or
      stopping the playing of the voice.

6. The method of claim 1, wherein the selecting a knowledge message further comprising one of the following:
   selecting a knowledge message based on a matching of the input and a keyword associated with a knowledge message, wherein each knowledge message of the set of knowledge messages is associated with at least one keyword;
   selecting a knowledge message based on at least one of historical usage data of a user, historical usage data of a user group to which the user belongs, and ranking of the knowledge messages;
   selecting a knowledge message which is matched with a usage habit of the user; or
   selecting a knowledge message which is not matched with the usage habit of the user.

7. The method of claim 1, wherein the generating the at least a part of the set of knowledge messages further comprises:
   changing texts of the summarizations to texts conforming to a virtual personality of a chatbot; and/or
   transforming the changed texts of the summarizations to voices conforming to the virtual personality of the chatbot.

8. The method of claim 1, wherein the generating the at least a part of the set of knowledge messages further comprises:
   generating a plurality of user groups based on the user data;
   generating a plurality of web groups based on the web data;
   selecting contents from the web data for user clusters based on the plurality of user groups and the plurality of web groups; and
   generating the at least a part of the set of knowledge messages by transforming summarizations of the selected contents to the at least a part of the set of knowledge messages.

9. The method of claim 1, wherein the generating the at least a part of the set of knowledge messages further comprises:
   obtaining multiple contents which are related to a topic along a time line or at a similar time point;
   generating a knowledge message of the set of knowledge messages by using summarizations of the multiple contents which are related to the topic.

10. An apparatus for providing voice-based knowledge through intelligent automated chatting, comprising:
    at least one processor; and
    memory including instructions that, when executed by the at least one processor, cause the at least one processor to perform operations to:
       generate at least a part of a set of knowledge messages based on web data or based on both the web data and user data by extracting summarizations from contents of the web data, wherein each of the summarizations include a number of sentences wherein a number of sentences in each summarization is determined based on a predefined length of a voice;
       receive an input;
       select a knowledge message from the set of knowledge messages in response to the input, wherein a length of a voice corresponding to each knowledge message of the set of knowledge messages is no more than the predefined length; and
       output a voice corresponding to the selected knowledge message in a conversation of the intelligent automated chatting.

11. The apparatus of claim 10, wherein the set of knowledge messages are in the form of voices or texts.

12. The apparatus of claim 10, wherein each knowledge message of the set of knowledge messages conforms to a virtual personality of a chatbot.

13. The apparatus of claim 10, wherein the instructions to receive the input include instructions to:
    receive a query in the conversation; or
    receive a signal indicating an operation on a control button.

14. The apparatus of claim 10, the memory further including instructions that, when executed by the at least one processor, cause the at least one processor to perform operations to:
    receive a second input; and
    perform at least one of the following in response to the second input:
       output a next voice corresponding to a next knowledge message;

output multiple voices corresponding to multiple knowledge messages sequentially;

recommend to push knowledge messages proactively;

output at least one keyword associated to at least one knowledge message;

pause playing of the voice during which the second input is received or resuming the playing of the voice; or stop the playing of the voice.

15. The apparatus of claim 10, the instructions to select the knowledge message further comprising instructions that, when executed by the at least one processor, cause the at least one processor to perform operations to:

select a knowledge message based on a matching of the input and a keyword associated with a knowledge message; wherein each knowledge message of the set of knowledge messages is associated with at least one keyword;

select a knowledge message based on at least one of historical usage data of a user, historical usage data of a user group to which the user belongs, and ranking of the knowledge messages;

select a knowledge message which is matched a usage habit of the user; or select a knowledge message which is not matched with the usage habit of the user.

16. The apparatus of claim 10, the memory further including instructions that, when executed by the at least one processor, cause the at least one processor to:

change texts of the summarizations to texts conforming to a virtual personality of a chatbot; and/or transform the changed texts of the summarizations to voices conforming to the virtual personality of the chatbot.

17. A computer system, comprising one or more processors; and a memory storing computer-executable instructions that, when executed, cause the one or more processors to:

generate at least a part of a set of knowledge messages based on web data or based on both the web data and user data by extracting summarizations from contents of the web data, wherein each of the summarizations include a number of sentences, wherein a number of sentences in each summarization is determined based on a predefined length of a voice;

receive an input;

select a knowledge message from the set of knowledge messages in response to the input, wherein a length of a voice corresponding to each knowledge message of the set of knowledge messages is no more than the predefined length; and output a voice corresponding to the selected knowledge message in a conversation of intelligent automated chatting.

* * * * *